US012505804B2

(12) United States Patent
Zhang et al.

(10) Patent No.: US 12,505,804 B2
(45) Date of Patent: Dec. 23, 2025

(54) DISPLAY SUBSTRATE, DISPLAY, AND DISPLAY SUBSTRATE DRIVING METHOD

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Tiaomei Zhang, Beijing (CN); Mengqi Wang, Beijing (CN); Wenhui Gao, Beijing (CN); Ziyang Yu, Beijing (CN); Tianyi Cheng, Beijing (CN); Wenbo Chen, Beijing (CN); Zhiliang Jiang, Beijing (CN); Ming Hu, Beijing (CN)

(73) Assignees: CHENGDU BOE OPTOELECTRONICS TECHNOLOGY CO., LTD., Sichuan (CN); Beijing BOE Technology Development Co., Ltd., Beijing (CN)

( * ) Notice: Subject to any disclaimer, the term of this patent is extended or adjusted under 35 U.S.C. 154(b) by 41 days.

(21) Appl. No.: 18/290,909

(22) PCT Filed: Apr. 26, 2023

(86) PCT No.: PCT/CN2023/090811

§ 371 (c)(1),
(2) Date: Jan. 22, 2024

(87) PCT Pub. No.: WO2024/130924

PCT Pub. Date: Jun. 27, 2024

(65) Prior Publication Data

US 2025/0104643 A1 Mar. 27, 2025

(30) Foreign Application Priority Data

Dec. 21, 2022 (CN) ......................... 202211650934.0

(51) Int. Cl.
*G09G 3/3266* (2016.01)

(52) U.S. Cl.
CPC ....... *G09G 3/3266* (2013.01); *G09G 2310/08* (2013.01); *G09G 2330/021* (2013.01)

(58) Field of Classification Search
None
See application file for complete search history.

(56) References Cited

U.S. PATENT DOCUMENTS

2011/0032231 A1* 2/2011 Maruyama ........... G09G 3/2096 345/208
2011/0157131 A1 6/2011 Miyake
(Continued)

FOREIGN PATENT DOCUMENTS

CN 109767744 A 5/2019
CN 110246454 A 9/2019
(Continued)

OTHER PUBLICATIONS

Office Action dated Jan. 14, 2025, issued in counterpart CN Application No. 202211650934.0, with English translation. (12 pages).

*Primary Examiner* — Krishna P Neupane
(74) *Attorney, Agent, or Firm* — WHDA, LLP

(57) ABSTRACT

This disclosure provides a display substrate, a display, and a display substrate driving method. The display substrate includes a first-category pixel row, a second-category pixel row, a first drive line, a second drive line and at least one category of data signal source; a first gate on array (GOA) circuit is used for providing a starting signal of a first frequency to the first-category pixel row; a second GOA circuit is used for providing a starting signal of a second frequency to the second-category pixel row; the at least one category of data signal source is used for supplying a data
(Continued)

signal to data signal lines of the first-category pixel row and the second-category pixel row.

5 Claims, 12 Drawing Sheets

(56) References Cited

U.S. PATENT DOCUMENTS

| | | | | |
|---|---|---|---|---|
| 2015/0358018 | A1* | 12/2015 | Kim | G09G 3/20 345/208 |
| 2016/0042708 | A1 | 2/2016 | Wang et al. | |
| 2021/0027720 | A1* | 1/2021 | Park | G09G 3/3291 |
| 2021/0035488 | A1 | 2/2021 | Seo et al. | |
| 2021/0295759 | A1* | 9/2021 | Tang | G09G 3/20 |
| 2021/0407425 | A1* | 12/2021 | Huang | G09G 3/3266 |
| 2022/0180782 | A1* | 6/2022 | Nishio | G09F 9/30 |
| 2023/0335064 | A1* | 10/2023 | Her | G09G 3/3266 |

FOREIGN PATENT DOCUMENTS

| | | | |
|---|---|---|---|
| CN | 112908253 | A | 6/2021 |
| CN | 113178161 | A | 7/2021 |
| CN | 114863863 | A | 8/2022 |
| CN | 115273746 | A | 11/2022 |
| CN | 115311980 | A | 11/2022 |
| CN | 115311996 | A | 11/2022 |
| CN | 115938300 | A | 4/2023 |
| KR | 20120101715 | A | 9/2012 |

* cited by examiner

DISPLAY SUBSTRATE, DISPLAY, AND DISPLAY SUBSTRATE DRIVING METHOD

CROSS-REFERENCE TO RELATED APPLICATIONS

This application is the U.S. national phase of PCT Application No. PCT/CN2023/090811 filed on Apr. 26, 2023, which claims priority to Chinese Patent Application No. 202211650934.0 filed in China on Dec. 21, 2022, disclosures of which is are hereby incorporated by reference in their entireties.

TECHNICAL FIELD

The present disclosure relates to the field of display technology, and in particular to a display substrate, a display, and a display substrate driving method.

BACKGROUND

With the rapid development of semiconductor technology, active-matrix organic light-emitting diode (AMOLED) display screens have been widely used, such as in mobile phones, smart bracelets, wrist watches, vehicle-mounted displays, notebook computers, and televisions. The refresh rate is an important parameter of the display screen, and refers to the quantity of images displayed per second on the display screen.

SUMMARY

Embodiments of the present disclosure provide a display substrate, a display, and a display substrate driving method. The specific technical solutions are as follows.

In a first aspect, an embodiment of the present disclosure provides a display substrate including:

- a first-category pixel row, a second-category pixel row, a first drive line, a second drive line, and at least one category of data signal source;
- the first drive line is used for providing a starting signal of a first frequency to the first-category pixel row; the second drive line is used for providing a starting signal of a second frequency to the second-category pixel row; and
- the at least one category of data signal source is used for providing a data signal to data signal lines of the first-category pixel row and the second-category pixel row.

In a possible implementation, the first-category pixel row forms a first display region of the display substrate, and the second-category pixel row forms a second display region of the display substrate, a display region of the display substrate including the first display region and the second display region.

In a possible implementation, a display region formed by the first-category pixel row and a display region formed by the second-category pixel row are alternately arranged on the display substrate.

In a possible implementation, the at least one category of data signal source includes a first-category data signal source; the first-category data signal source is connected to the data signal line of the first-category pixel row via a first-category switch, and is also connected to the data signal line of the second-category pixel row via a second-category switch; and

- the display substrate further includes a first control line and a second control line; the first control line is connected to a gate electrode of the first-category switch; the second control line is connected to a gate electrode of the second-category switch; the first-category switch is used for controlling on-off of the data signal line of the first-category pixel row, and the second-category switch is used for controlling on-off of the data signal line of the second-category pixel row.

In a possible implementation, in case that the first-category pixel row and the second-category pixel row are refreshed at a same frequency, a duration of a time period corresponding to each image frame is the same;

- the time period corresponding to each image frame includes a first stage and a second stage; in the first stage of the time period, the first control line inputs a first voltage signal, the first-category switch is turned on, the first drive line inputs a starting signal, the second control line inputs a second voltage signal, the second-category switch is turned off, and the second drive line does not input a starting signal; in the second stage of the time period, the first control line inputs a second voltage signal, the first-category switch is turned off, the first drive line does not input a starting signal, the second control line inputs a first voltage signal, the second-category switch is turned on, and the second drive line inputs a starting signal.

In a possible implementation, in case that a refresh frequency of the first-category pixel row is lower than a refresh frequency of the second-category pixel row, and a duration of a time period corresponding to a first-category image frame is different from a duration of a time period corresponding to a second-category image frame, the time period corresponding to the first-category image frame includes a first stage and a second stage, and a duration of the time period corresponding to the second-category image frame is the same as a duration of the second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

- for the time period corresponding to each first-category image frame, in the first stage of the time period, the first control line inputs a first voltage signal, the first-category switch is turned on, the first drive line inputs a starting signal, the second control line inputs a second voltage signal, the second-category switch is turned off, and the second drive line does not input a starting signal; in the second stage of the time period, the first control line inputs a second voltage signal, the first-category switch is turned off, the first drive line does not input a starting signal, the second control line inputs a first voltage signal, the second-category switch is turned on, and the second drive line inputs a starting signal; and
- in the time period corresponding to each second-category image frame, the first control line inputs a second voltage signal, the first-category switch is turned off, the first drive line does not input a starting signal, the second control line inputs a first voltage signal, the second-category switch is turned on, and the second drive line inputs a starting signal.

In a possible implementation, in case that a refresh frequency of the first-category pixel row is lower than a refresh frequency of the second-category pixel row, and a duration of a time period corresponding to a first-category image frame is the same as a duration of a time period corresponding to a second-category image frame, the time period corresponding to the first-category image frame includes a first stage and a second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for the time period corresponding to each first-category image frame, in the first stage of the time period, the first control line inputs a first voltage signal, the first-category switch is turned on, the first drive line inputs a starting signal, the second control line inputs a second voltage signal, the second-category switch is turned off, and the second drive line does not input a starting signal; in the second stage of the time period, the first control line inputs a second voltage signal, the first-category switch is turned off, the first drive line does not input a starting signal, the second control line inputs a first voltage signal, the second-category switch is turned on, and the second drive line inputs a starting signal; and in the time period corresponding to each second-category image frame, the first control line inputs a second voltage signal, the first-category switch is turned off, the first drive line does not input a starting signal, the second control line inputs a first voltage signal, the second-category switch is turned on, and the second drive line inputs a starting signal.

In a possible implementation, in case that a refresh frequency of the first-category pixel row is lower than a refresh frequency of the second-category pixel row, and a duration of a time period corresponding to a first-category image frame is the same as a duration of a time period corresponding to a second-category image frame, the time period corresponding to the first-category image frame includes a first stage and a second stage, and the time period corresponding to the second-category image frame includes a first stage and a second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for the time period corresponding to each first-category image frame, in the first stage of the time period, the first control line inputs a first voltage signal, the first-category switch is turned on, the first drive line inputs a starting signal, the second control line inputs a second voltage signal, the second-category switch is turned off, and the second drive line does not input a starting signal; in the second stage of the time period, the first control line inputs a second voltage signal, the first-category switch is turned off, the first drive line does not input a starting signal, the second control line inputs a first voltage signal, the second-category switch is turned on, and the second drive line inputs a starting signal; and for the time period corresponding to each second-category image frame, in the first stage of the time period, the first control line inputs a second voltage signal, the first-category switch is turned off, the first drive line does not input a starting signal, the second control line inputs a first voltage signal, the second-category switch is turned on, and the second drive line does not input a starting signal; in the second stage of the time period, the first control line inputs a second voltage signal, the first-category switch is turned off, the first drive line does not input a starting signal, the second control line inputs a first voltage signal, the second-category switch is turned on, and the second drive line inputs a starting signal.

In a possible implementation, the at least one category of data signal source includes a first-category data signal source; the display substrate further includes a third control line, the third control line is connected to a gate electrode of a third-category switch, the third-category switch is connected between the data signal line of the first-category pixel row and the data signal line of the second-category pixel row, and the first-category data signal source is connected to the data signal line of the second-category pixel row.

In a possible implementation, in case that the first-category pixel row and the second-category pixel row are refreshed at a same frequency, a duration of a time period corresponding to each image frame is the same;

the time period corresponding to each image frame includes a first stage and a second stage; in the first stage of the time period, the third control line inputs a first voltage signal, the third-category switch is turned on, the data signal line of the first-category pixel row and the data signal line of the second-category pixel row are connected, the first drive line inputs a starting signal, and the second drive line does not input a starting signal; in the second stage of the time period, the third control line inputs a second voltage signal, the third-category switch is turned off, the data signal line of the first-category pixel row is disconnected from the data signal line of the second-category pixel row, the first drive line does not input a starting signal, and the second drive line inputs a starting signal.

In a possible implementation, in case that a refresh frequency of the first-category pixel row is lower than a refresh frequency of the second-category pixel row, and a duration of a time period corresponding to a first-category image frame is different from a duration of a time period corresponding to a second-category image frame, the time period corresponding to the first-category image frame includes a first stage and a second stage, and a duration of the time period corresponding to the second-category image frame is the same as a duration of the second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for the time period corresponding to each first-category image frame, in the first stage of the time period, the third control line inputs a first voltage signal, the third-category switch is turned on, the data signal line of the first-category pixel row and the data signal line of the second-category pixel row are connected, and the first drive line inputs a starting signal, and the second drive line does not input a starting signal; in the second stage of the time period, the third control line inputs a second voltage signal, the third-category switch is turned off, the data signal line of the first-category pixel row is disconnected from the data signal line of the second-category pixel row, the first drive line does not input a starting signal, and the second drive line inputs a starting signal; and in the time period corresponding to each second-category image frame, the third control line inputs a second voltage signal, the third-category switch is turned off, the data signal line of the first-category pixel row is disconnected from the data signal line of the second-category pixel row, the first drive line does not input a starting signal, and the second drive line inputs a starting signal.

In a possible implementation, in case that a refresh frequency of the first-category pixel row is lower than a refresh frequency of the second-category pixel row, and a duration of a time period corresponding to a first-category image frame is the same as a duration of a time period corresponding to a second-category image frame, the time period corresponding to the first-category image frame includes a first stage and a second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for the time period corresponding to each first-category image frame, in the first stage of the time period, the third control line inputs a first voltage signal, the third-category switch is turned on, the data signal line of the first-category pixel row and the data signal line of the second-category pixel row are connected, and the first drive line inputs a starting signal, and the second drive line does not input a starting signal; in the second stage of the time period, the third control line inputs a second voltage signal, the third-category switch is turned off, the data signal line of the first-category pixel row is disconnected from the data signal line of the second-category pixel row, the first drive line does not input a starting signal, and the second drive line inputs a starting signal; and in the time period corresponding to each second-category image frame, the third control line inputs a second voltage signal, the third-category switch is turned off, the data signal line of the first-category pixel row is disconnected from the data signal line of the second-category pixel row, the first drive line does not input a starting signal, and the second drive line inputs a starting signal.

In a possible implementation, the at least one category of data signal source includes a second-category data signal source and a third-category data signal source; the second-category data signal source is connected to the data signal line of the first-category pixel row, and the third-category data signal source is connected to the data signal line of the second-category pixel row.

In a possible implementation, in case that the first-category pixel row and the second-category pixel row are refreshed at a same frequency, a duration of a time period corresponding to each image frame is the same;

the time period corresponding to each image frame includes a first stage and a second stage; in the first stage of the time period, the second-category data signal source outputs a data signal, the first drive line inputs a starting signal, the third-category data signal source does not output a data signal, and the second drive line does not input a starting signal; in the second stage of the time period, the second-category data signal source does not output a data signal, the first drive line does not input a starting signal, the third-category data signal source outputs a data signal, and the second drive line inputs a starting signal.

In a possible implementation, in case that a refresh frequency of the first-category pixel row is lower than a refresh frequency of the second-category pixel row, and a duration of a time period corresponding to a first-category image frame is different from a duration of a time period corresponding to a second-category image frame, the time period corresponding to the first-category image frame includes a first stage and a second stage, and a duration of the time period corresponding to the second-category image frame is the same as a duration of the second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for the time period corresponding to each first-category image frame, in the first stage of the time period, the second-category data signal source outputs a data signal, the first drive line inputs a starting signal, the third-category data signal source does not output a data signal, and the second drive line does not input a starting signal; in the second stage of the time period, the second-category data signal source does not output a data signal, the first drive line does not input a starting signal, the third-category data signal source outputs a data signal, and the second drive line inputs a starting signal; and in the time period corresponding to each second-category image frame, the second-category data signal source does not output a data signal, the first drive line does not input a starting signal, the third-category data signal source outputs a data signal, and the second drive line inputs a starting signal.

In a possible implementation, in case that a refresh frequency of the first-category pixel row is lower than a refresh frequency of the second-category pixel row, and a duration of a time period corresponding to a first-category image frame is the same as a duration of a time period corresponding to a second-category image frame, the time period corresponding to the first-category image frame includes a first stage and a second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for the time period corresponding to each first-category image frame, in the first stage of the time period, the second-category data signal source outputs a data signal, the first drive line inputs a starting signal, the third-category data signal source does not output a data signal, and the second drive line does not input a starting signal; in the second stage of the time period, the second-category data signal source does not output a data signal, the first drive line does not input a starting signal, the third-category data signal source outputs a data signal, and the second drive line inputs a starting signal; and in the time period corresponding to each second-category image frame, the second-category data signal source does not output a data signal, the first drive line does not input a starting signal, the third-category data signal source outputs a data signal, and the second drive line inputs a starting signal.

In a possible implementation, in case that a refresh frequency of the first-category pixel row is lower than a refresh frequency of the second-category pixel row, and a duration of a time period corresponding to a first-category image frame is the same as a duration of a time period corresponding to a second-category image frame, the time period corresponding to the first-category image frame includes a first stage and a second stage, and the time period corresponding to the second-category image frame includes a first stage and a second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for the time period corresponding to each first-category image frame, in the first stage of the time period, the second-category data signal source outputs a data signal, the first drive line inputs a starting signal, the third-category data signal source does not output a data signal, and the second drive line does not input a starting signal; in the second stage of the time period, the second-category data signal source does not output a data signal, the first drive line does not input a starting signal, the third-category data signal source outputs a data signal, and the second drive line inputs a starting signal; and for the time period corresponding to each second-category image frame, in the first stage of the time period, the second-category data signal source does not output a data signal, the first drive line does not input a starting signal, the third-category data signal source outputs a data signal, and the second drive line does not input a starting signal; in the second stage of the time period, the second-category data signal source does not output a data signal, the first drive line does not input a starting signal, the third-category data signal source outputs a data signal, and the second drive line inputs a starting signal.

In a second aspect, an embodiment of the present disclosure provides a display screen including the aforementioned display substrate.

In a third aspect, an embodiment of the present disclosure provides a driving method of a display substrate, the method is applied to the aforementioned display substrate, the method includes:

using the first drive line to provide a starting signal of a first frequency to the first-category pixel row, and using the at least one category of data signal source to provide a data signal to the data signal line of the first-category pixel row, to refresh the first-category pixel row at the first frequency; and using the second drive line to provide a starting signal of a second frequency to the second-category pixel row, and using the at least one category of data signal source to provide a data signal to the data signal line of the second-category pixel row, to refresh the second-category pixel row at the second frequency.

In a possible implementation, the using the first drive line to provide a starting signal of the first frequency to the first-category pixel row, and using the at least one category of data signal source to provide the data signal to the data signal line of the first-category pixel row, to refresh the first-category pixel row at the first frequency; and, using the second drive line to provide a starting signal of the second frequency to the second-category pixel row, and using the at least one category of data signal source to provide a data signal to the data signal line of the second-category pixel row, to refresh the second-category pixel row at the second frequency includes:

using the first drive line to provide the starting signal of the first frequency to the first-category pixel row, using the first control line to control the first-category switch to be turned on, and using the second control line to control the second-category switch to be turned off; in case that the first-category switch is turned on, using the first-category data signal source to provide the data signal to the data signal line of the first-category pixel row, to refresh the first-category pixel row at the first frequency; and using the second drive line to provide the starting signal of the second frequency to the second-category pixel row, using the second control line to control the second-category switch to be turned on, and using the first control line to control the first-category switch to be turned off; in case that the second-category switch is turned on, using the first-category data signal source to provide the data signal to the data signal line of the second-category pixel row, to refresh the second-category pixel row at the second frequency.

In a possible implementation, the using the first drive line to provide a starting signal of the first frequency to the first-category pixel row, and using the at least one category of data signal source to provide the data signal to the data signal line of the first-category pixel row, to refresh the first-category pixel row at the first frequency; and, using the second drive line to provide a starting signal of the second frequency to the second-category pixel row, and using the at least one category of data signal source to provide the data signal to the data signal line of the second-category pixel row, to refresh the second-category pixel row at the second frequency includes:

using the first drive line to provide the starting signal of the first frequency to the first-category pixel row, and using the third control line to control the third-category switch to be turned on; in case that the third-category switch is turned on, using the first-category data signal source to provide the data signal to the data signal line of the first-category pixel row, to refresh the first-category pixel row at the first frequency; and using the second drive line to provide the starting signal of the second frequency to the second-category pixel row, using the third control line to control the third-category switch to be turned off, and using the first-category data signal source to provide the data signal to the data signal line of the second-category pixel row, to refresh the second-category pixel row at the second frequency.

BRIEF DESCRIPTION OF THE DRAWINGS

In order that technical solutions of the embodiments of the present disclosure or the related art may be more clearly understood, drawings used in description of the embodiments or the related art are briefly introduced hereinafter. Apparently, the described drawings merely illustrate a part of the disclosed embodiments. A person of ordinary skill in the art can obtain other embodiments based on the accompanying drawings.

DETAILED DESCRIPTION

In the following, technical solutions in embodiments of the present disclosure will be described in a clear and thorough manner with reference to the drawings related to the embodiments. Obviously, the described embodiments are merely a part of, rather than all of, the embodiments of the present disclosure. Based on the embodiments of the present disclosure, a person skilled in the art may obtain other embodiments, which also fall within the scope of the present disclosure.

Figure 1A:
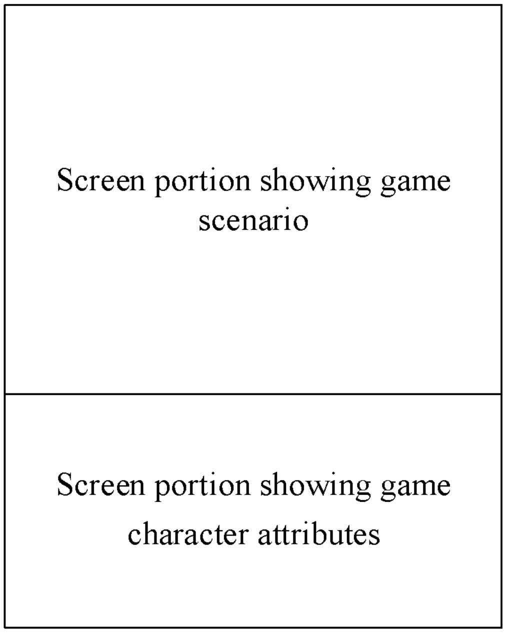
FIG. 1*a* is a schematic diagram of a screenshot of a high frame rate game in the related art.
Figure 1B:
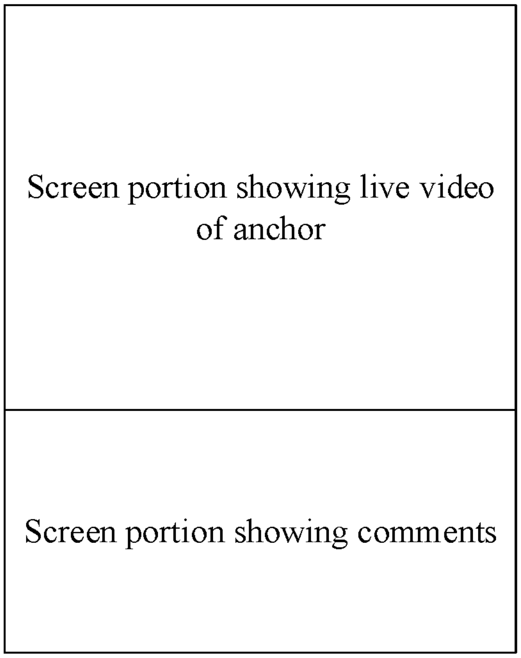
FIG. 1*b* is a schematic diagram of a screenshot of a live webcast scenario in the related art.

With the rapid development of semiconductor technology, active-matrix organic light-emitting diode (AMOLED) display screens are used in various industries, such as mobile phones, smart bracelets, wrist watches, vehicle-mounted displays, notebook computers, and televisions. However, with the popularity of high frame rate games, higher requirements on the screen refresh rate are put forward, and display screens with high refresh rate and even ultra-high refresh rate are gradually required by all walks of life. However, the refresh rate required by display screens is different in different situations, for example, for the high frame rate game shown in FIG. 1*a*, the refresh rate required by the screen portion showing a game scene is relatively high, while the refresh rate required by the screen portion showing game character's attributes is relatively low; for example, for the live webcast scenario shown in FIG. 1*b*, the screen portion showing live video of the anchor requires a higher refresh rate, while the screen portion showing comments requires a lower refresh rate. In view of the above, using a high refresh frequency for the entire display screen will cause a high display power consumption, resulting in a reduced standby time of the display product.

In view of this, an embodiment of the present disclosure provides a display substrate including:

A first-category pixel row, a second-category pixel row, a first drive line, a second drive line, and at least one category of source signal source (data signal source);

the first drive line is used for providing a starting signal of a first frequency to the first-category pixel row; the second drive line is used for providing a starting signal of a second frequency to the second-category pixel row; and the at least one category of data signal source is used for providing a data signal to data signal lines of the first-category pixel row and the second-category pixel row.

The first-category pixel row and the second-category pixel row may be manufactured by using the same or different manufacturing processes; the first drive line provides a gate on array (GOA, array substrate row driving circuit) starting signal to the first-category pixel row; and the second drive line provides a GOA starting signal to the second-category pixel row. The first drive line can provide a starting signal at a first frequency, and the second drive line can provide a starting signal at a second frequency; therefore, the first-category pixel row can perform picture refreshing according to the first frequency, and the second-category pixel row can perform picture refreshing according to the second frequency, so that pixels in the same display substrate may be refreshed using different refresh frequencies, and display power consumption can be reduced, thereby increasing standby time of a display product.

Figure 2A:
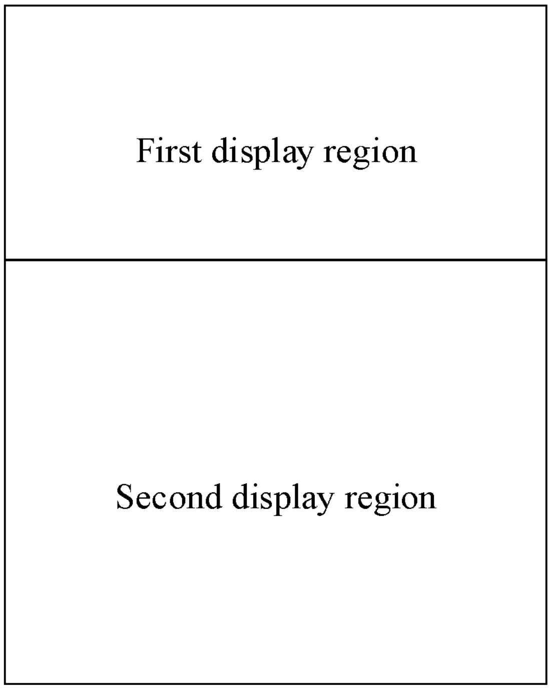
FIG. 2*a* is a schematic diagram of a display region in an embodiment of the present disclosure.
Figure 2B:
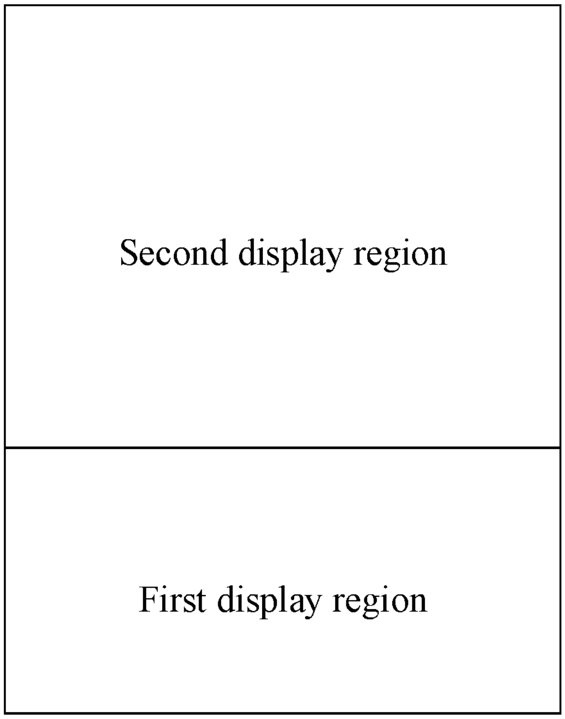
FIG. 2*b* is another schematic diagram of a display region in an embodiment of the present disclosure.

The arrangement of the first-category pixel row and the second-category pixel row can be designed according to practical requirements. In a possible implementation, the display region of the display substrate includes a first display region and a second display region, the first-category pixel row being located in the first display region and the second-category pixel row being located in the second display region. The first-category pixel row constitutes the first display region of the display substrate, and the second-category pixel row constitutes the second display region of the display substrate, and positions of the first display region and the second display region in the display substrate can be customized according to actual situations; in one example, as shown in FIG. 2*a*, the first display region is located above the second display region, and in one example, as shown in FIG. 2*b*, the first display region is located below the second display region.

In the embodiments of the present disclosure, the display region of the display substrate includes the first display region and the second display region, wherein the first display region and the second display region can be refreshed at different refresh frequencies, and can be applicable to scenarios where the refresh frequency requirements of an upper screen portion and a lower screen portion are different, such as high frame rate games and live webcasts, to reduce display power consumption and increase standby time of a display product.

Figure 3:
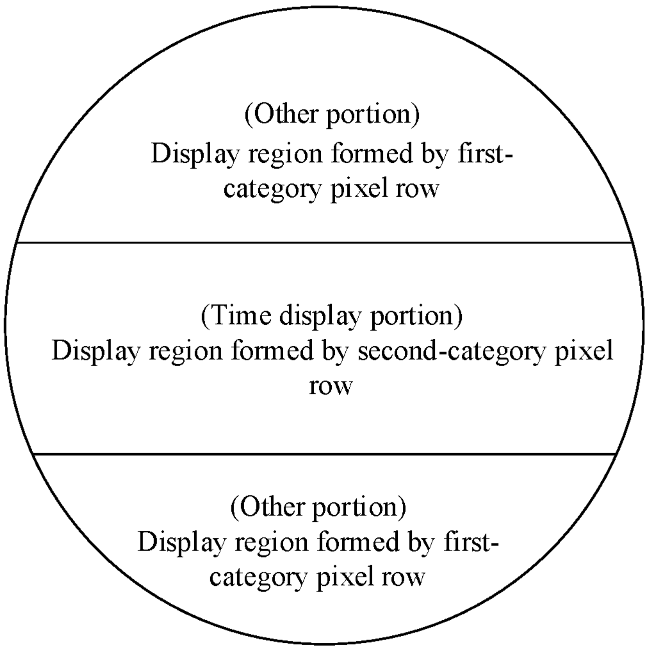
FIG. 3 is yet another schematic diagram of a display region in an embodiment of the present disclosure.

The first-category pixel row and the second-category pixel row may also be arranged alternately. In a possible implementation, a display region formed by the first-category pixel row and a display region formed by the second-category pixel row are alternately arranged on the display substrate. In one example, as shown in FIG. 3, for a watch display screen, only the time display portion in the middle needs a higher refresh frequency, while a lower refresh frequency is adequate for the other portions; therefore an alternate arrangement can be used to achieve that the time display portion and the other portions use different respective refresh frequencies, thereby reducing display power consumption and increasing standby time of a display product.

The at least one category of data signal source may only include one category of data signal source, and the one category of data signal source is used in combination with switches to provide a data signal to the first-category pixel row and the second-category pixel row; the at least one category of data signal source may also include two categories of data signal sources, the two categories of data signal sources being used for providing data signals to the first-category pixel row and the second-category pixel row, respectively.

In a possible implementation, the at least one category of data signal source includes a first-category data signal source; the first-category data signal source is connected to the data signal line of the first-category pixel row via a first-category switch, and is also connected to the data signal line of the second-category pixel row via a second-category switch;

the display substrate further includes a first control line and a second control line; the first control line is connected to a gate electrode of the first-category switch; the second control line is connected to a gate electrode of the second-category switch; wherein the first-category switch is used for controlling on-off of the data signal line of the first-category pixel row, and the second-category switch is used for controlling on-off of the data signal line of the second-category pixel row.

Figure 4A:
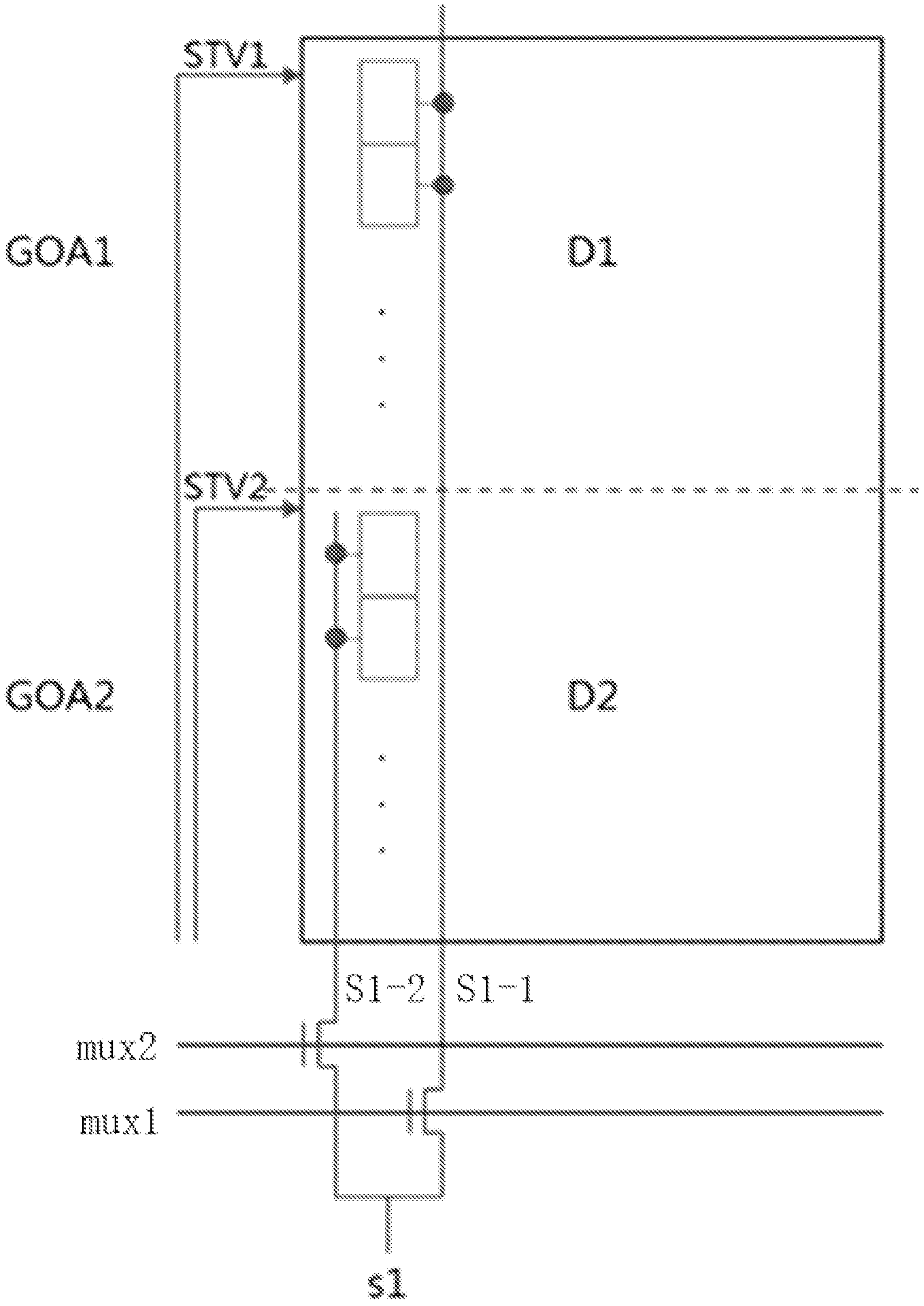
FIG. 4*a* is a schematic diagram of a display substrate according to an embodiment of the present disclosure.

Referring to FIG. 4*a*, a display region of a display substrate includes a first display region D1 and a second display region D2, wherein a first-category pixel row is located in the first display region D1, and a second-category pixel row is located in the second display region D2. S1 is a data line of a first-category data signal source; one pixel column in the display substrate corresponds to one first-category data signal source; and similarly, one first-category data signal source corresponds to one pixel column in the display substrate, namely, a first-category data signal source i (the $i^{th}$ first-category data signal source) corresponds to a pixel column i (the $i^{th}$ pixel column) in the display substrate on a one-to-one basis, where $1 \le i \le N$, i being a positive integer greater than or equal to 1, and N being a total quantity of pixel columns of the display substrate. For a first-category data signal source i, a data line Si of the first-category data signal source i is connected to an data signal line of the $i^{th}$ pixel in each first-category pixel row via a first-category switch; for example, assuming there are a quantity m of first-category pixel rows, then the Si is connected to the data signal lines of m pixels in D1 in total; in addition, the Si is also connected to the data signal line of the $i^{th}$ pixel in each second-category pixel row via the second-category switch; for example, assuming there are a quantity n of second-category pixel rows, then the Si is connected to the data signal lines of n pixels in D2 in total; wherein m and n are both positive integers. For example, the data line S1 of the first-category data signal source 1 is connected to the data signal line S1-1 of the first pixel in the first-category pixel row via a first-category switch, and the data line S1 of the first-category data signal source 1 is also connected to the data signal line S1-2 of the first pixel in the second-category pixel row via a second-category switch. The first control line mux1 is connected to the gate electrode of the first-category switch, the second control line mux2 is connected to the gate electrode of the second-category switch, the first drive line GOAL is connected to the first-category pixel row in the first display region D1 to provide the first-category pixel row with a starting signal STV1 of a first frequency, and the second drive line GOA2 is connected to the second-category pixel row in the second display region D2 to provide the second-category pixel row with a starting signal STV2 of a second frequency. It can be understood that the positions of D1 and D2 can be swapped, which still falls within the scope of the present disclosure.

Figure 4B:
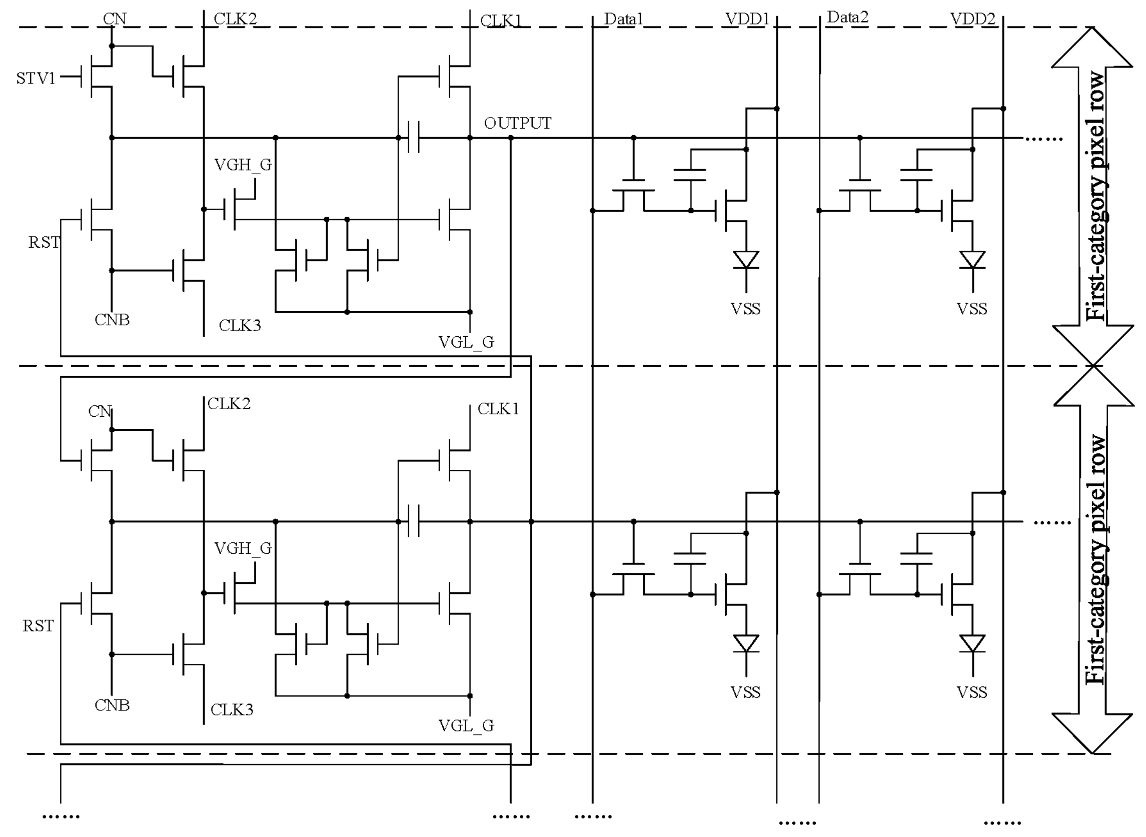
FIG. 4*b* is a schematic diagram of a first display region in an embodiment of the present disclosure.

The STV1 is a GOA starting signal provided by the first drive line GOA1 to the D1 region, that is, the frequency of the STV1 can determine the refresh frequency of the first-category pixel row in D1, and thereby control the refresh rate of the display substrate; in one example, the pixel drive circuit and the pixel circuit in D1 can be as shown in FIG. 4*b*, wherein CN is a first scanning control signal, CNB is a second scanning control signal, CLK1, CLK2 and CLK3 are three clock signals, VGH_G is a direct current high-level signal, and VGL_G is a direct current low-level signal; RST is a reset signal, VDD is a power supply anode, VSS is a power supply cathode, Data is a data signal, and OUTPUT is an output signal of the pixel driving circuit. The STV1 is input to an STV signal input terminal of the 1st first-category pixel row in D1, the OUTPUT of the pixel drive circuit of the 1st first-category pixel row (the first-category pixel row 1) outputs a control signal, and a gate electrode of the pixel circuit in the first-category pixel row 1 receives the control signal, and the pixel starts to be refreshed; at the same time, the OUTPUT also serves as the STV signal of the pixel driving circuit of the next first-category pixel row (the first-category pixel row 2). The OUTPUT of the first-category pixel row 2 serves as an RST signal of the first-category pixel row 1, in addition to the control signal of the gate electrode of the pixel circuit of the row 2 and the STV signal of the first-category pixel row 3. Other first-category pixel rows are similar, and the description thereof will not be repeated here. It can be seen that the pixel in D1 is refreshed once every time the first drive line provides the starting signal STV1, and therefore in the case that the first drive line provides the starting signal STV1 at a first frequency, the pixel in D1 is refreshed at the first frequency. In a similar fashion, the principle that the second drive line drives the pixel in D2 to refresh at the second frequency via the starting signal STV2 of the second frequency is similar, and the description thereof will not be repeated here. Of course, the display substrate may also include a plurality of display regions and corresponding starting signals STV.

It will be appreciated that the circuit shown in FIG. 4*b* is merely for the purpose of introducing the pixel refresh principle and is not intended to limit the application of the present disclosure to the circuit shown in FIG. 4*b*, and a person skilled in the art may replace part or all of the circuit in FIG. 4*b* with a pixel driving circuit and a pixel circuit in the related art, which still falls within the scope of the present disclosure. In one example, the drive line may be at least one of P-GOA, N-GOA, or EM-GOA. For example: the drive line for driving the P-type switching transistor of the pixel circuit in the display region of the display substrate is a P-GOA, the drive line for driving the N-type switching transistor of the pixel circuit in the display region of the display substrate is an N-GOA, and the drive line for driving the light-emitting control transistor of the pixel circuit in the display region of the display substrate is an EM-GOA. Accordingly, the starting signal STV may be one of a P-GOA starting signal, an N-GOA starting signal, and an EM-GOA starting signal.

In the embodiment according to the present disclosure, the GOA control unit is divided into two groups, wherein the GOAL provides the gate signal of the first display region D1, the GOA2 provides the gate signal of the second display region D2; signals of the same data source are divided into two groups, wherein the S1-1 controls the data signal of the first display region D1, the S1-2 controls the data signal of the second display region D2, and the data signals of the first display region and the second display region are fed in through the mux1 and the mux2, respectively. That is to say, the quantity of the first-category data signal source ICs (microelectronic components) is consistent with the quantity of pixel columns of the display substrate. For example, if the quantity of pixel columns in the display substrate is W, then W first-category data signal sources, W first-category switches and W second-category switches are required. In the embodiment of the present disclosure, W pixel columns correspond to W first-category data signal sources, and there is no need to additionally adding data of the first-category data signal source, thus the manufacturing cost of the display substrate can be reduced.

In the case that the display substrate is as shown in FIG. 4*a*, the first voltage signal and the second voltage signal are signals with opposite electrical levels, namely, high and low levels, or vice versa. The levels of the first voltage signal and the second voltage signal can be set according to actual situations, and are related to the types of the first-category switch and the second-category switch; the refresh time of each pixel row 1H=1/(D1 pixel row quantity×D1 refresh frequency+D2 pixel row quantity×D2 refresh frequency).

In a possible implementation, in case that the first-category pixel row and the second-category pixel row are refreshed at a same frequency, and a duration of a time period corresponding to each image frame is the same;

the time period corresponding to each image frame includes a first stage and a second stage; in the first stage of the time period, the first control line inputs a first voltage signal, the first-category switch is turned on, the first drive line inputs a starting signal, the second control line inputs a second voltage signal, the second-category switch is turned off, and the second drive line does not input a starting signal; in the second stage of the time period, the first control line inputs a second voltage signal, the first-category switch is turned off, the first drive line does not input a starting signal, the second control line inputs a first voltage signal, the second-category switch is turned on, and the second drive line inputs a starting signal.

Figure 5:
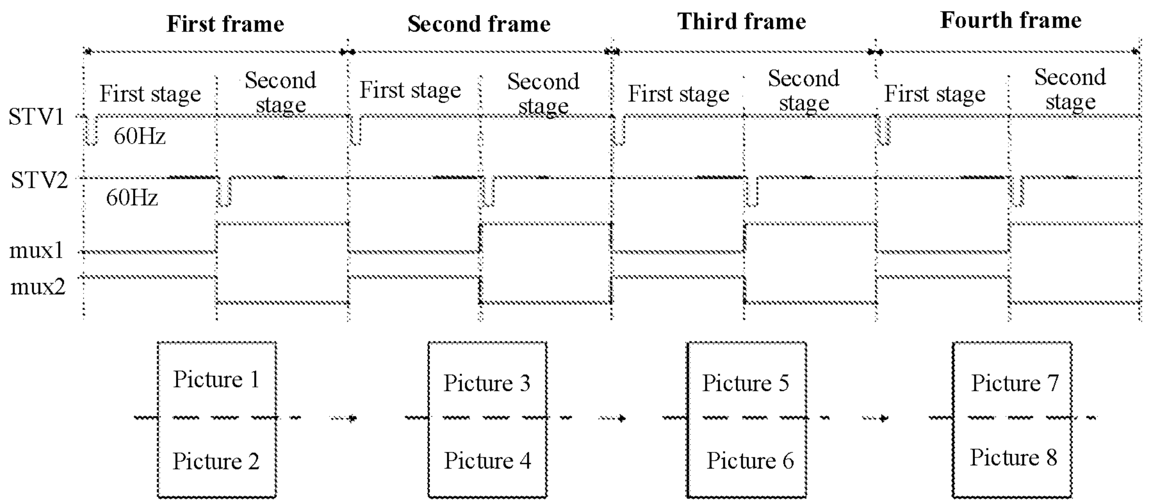
FIG. 5 is a first schematic diagram showing a refresh timing of a display substrate according to an embodiment of the present disclosure.

In one example, taking the first voltage signal being a low level, the second voltage signal being a high level, and a refresh frequency being 60 Hz as an example, the timing of STV1, STV2, mux1 and mux2 and the picture refresh situation can be as shown in FIG. 5; if D1 and D2 are refreshed at the same frequency, for any frame, in a first stage, mux1 inputs a low level, the first-category switch is turned on and D1 is refreshed, while mux2 inputs a high level, the second-category switch is turned off and D2 is not refreshed; in the second stage, the mux1 inputs a high level, the first-category switch is turned off and D1 is not refreshed, while the mux2 inputs a low level, the second-category switch is turned on and D2 is refreshed; 1H=1/(D1 pixel row quantity 1000×60 Hz+D2 pixel row quantity 1000×60 Hz)=8.33 μs.

In the embodiment of the present disclosure, the display region is divided into D1 and D2, and the two regions are driven by independent drive lines; and when both D1 and D2 are refreshed at a high frequency (for example, 120 Hz, 165 Hz, 240 Hz, etc.), the quantity of pixel rows in each region is less than the total quantity of pixel rows in the whole display region, hence the data writing time is extended, which is beneficial to the improvement of high frequency display image quality. In addition, in the case of using the same category of data signal source, the input of data signals in D1 and D2 are controlled via two categories of switches respectively, which can reduce the mutual influence of data signals in D1 and D2 regions, thereby improving the display quality.

In a possible implementation, in case that a refresh frequency of the first-category pixel row is lower than a refresh frequency of the second-category pixel row, and a duration of a time period corresponding to a first-category image frame is different from a duration of a time period corresponding to a second-category image frame, the time period corresponding to the first-category image frame includes a first stage and a second stage, and a duration of the time period corresponding to the second-category image frame is the same as a duration of the second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for the time period corresponding to each first-category image frame, in the first stage of the time period, the first control line inputs a first voltage signal, the first-category switch is turned on, the first drive line inputs a starting signal, the second control line inputs a second voltage signal, the second-category switch is turned off, and the second drive line does not input a starting signal; in the second stage of the time period, the first control line inputs a second voltage signal, the first-category switch is turned off, the first drive line does not input a starting signal, the second control line inputs a first voltage signal, the second-category switch is turned on, and the second drive line inputs a starting signal; and in the time period corresponding to each second-category image frame, the first control line inputs a second voltage signal, the first-category switch is turned off, the first drive line does not input a starting signal, the second control line inputs a first voltage signal, the second-category switch is turned on, and the second drive line inputs a starting signal.

Figure 6A:
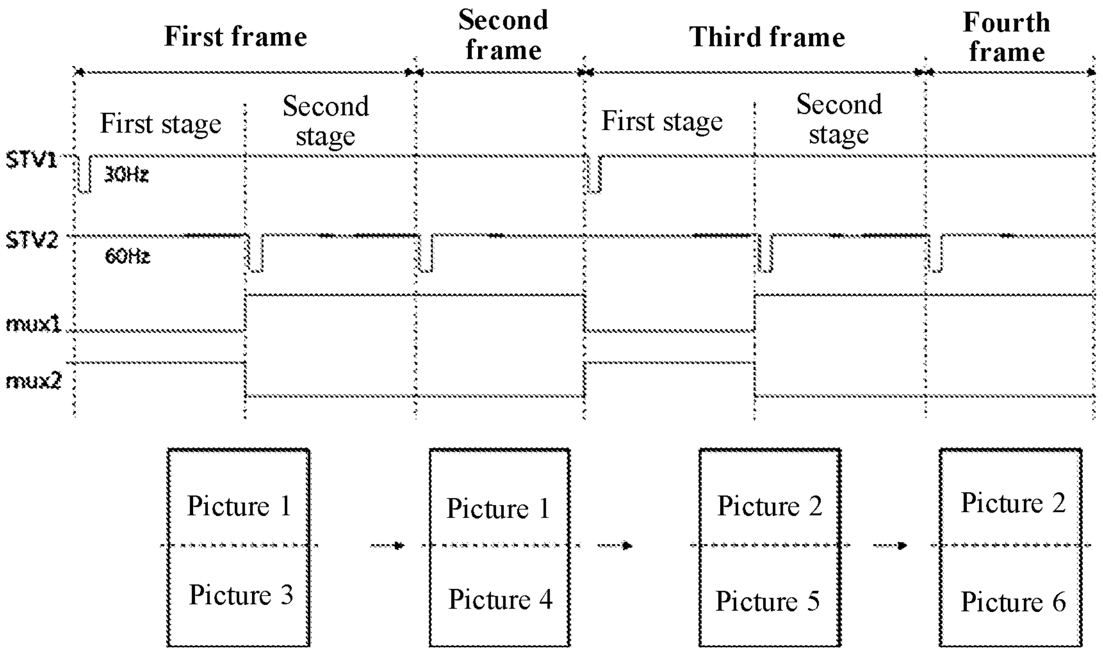
FIG. 6*a* is a second schematic diagram showing a refresh timing of a display substrate according to an embodiment of the present disclosure.

If D1 and D2 are refreshed at different frequencies, in one example, taking the refresh frequency of D1 being 30 Hz and the refresh frequency of D2 being 60 Hz as an example, the timing of STV1, STV2, mux1 and mux2 and the picture refresh situation can be as shown in FIG. 6*a*, and the first-category image frame is an image frame in which both the first-category pixel row and the second-category pixel row are refreshed, namely, a first frame, a third frame and a fifth frame, etc.; the second-category image frame is an image frame in which the first-category pixel row is not refreshed, and the second-category pixel row is refreshed, namely, a second frame, a fourth frame, a sixth frame, etc.; the duration of the corresponding period of the second frame is the same as the duration of the second stage in the first frame. For example: the active times of the STV1 and STV2 do not overlap with each other (the times when a low level signal is provided are staggered), and the active times of mux1 and mux2 do not overlap with each other either. In addition, the active time of mux2 is in direct proportion to the frequency of STV2, and the active time of mux1 is in direct proportion to the frequency of STV1, that is, the STV2 frequency=P×STV1 frequency, then the active time of mux2=P×the active time of mux1, and P is a natural number greater than 0.

For example, in the first frame: in the first stage, the mux1 inputs a low level, the first-category switch is turned on, the mux2 inputs a high level, the second-category switch is turned off, D1 is refreshed, and D2 is not refreshed; after refreshing in D1 is completed, the second stage is entered, the mux1 inputs the high level, the first-category switch is turned off, and the mux2 inputs the low level, the second-category switch is turned on, and the refreshing in D2 begins; in the second frame, the mux1 inputs a high level, the first-category switch remains off, the picture in D1 is unchanged, the mux2 inputs the low level, the second-category switch remains on, and D2 continues to be refreshed at 60 Hz; in the third frame: in the first stage, the mux1 inputs a low level, the first-category switch is turned on, and the mux2 inputs a high level, the second-category switch is turned off, D1 continues to be refreshed at a frequency of 30 Hz; after the refreshing in the display region D1 is completed, the second stage is entered, the mux1 inputs the high level, the first-category switch is turned off, and the mux2 inputs the low level, the second-category switch is turned on, and D2 begins to be refreshed; the fourth frame is similar to the second frame; and refreshing in the following frames is repeated in the similar fashion. In this case, 1H=1/(D1 pixel row quantity 1000×30 Hz+D2 pixel row quantity 1000×60 Hz)=11.11 μs.

Figure 6B:
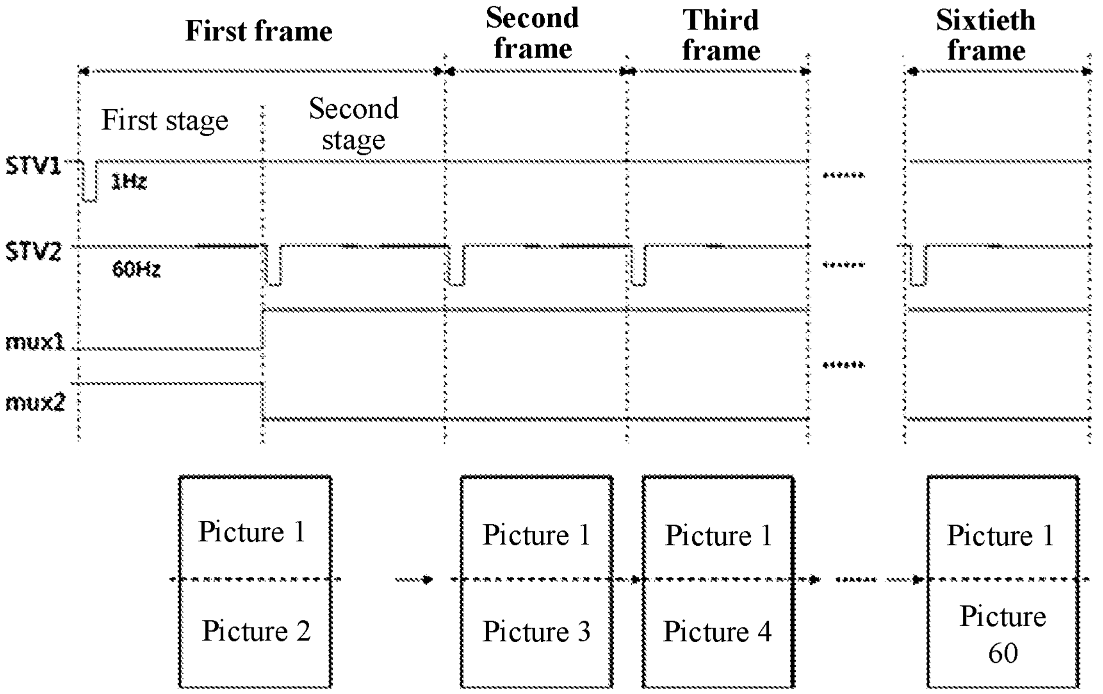
FIG. 6*b* is a third schematic diagram showing a refresh timing of a display substrate according to an embodiment of the present disclosure.

When D1 and D2 are refreshed at different frequencies, in one example, taking the refresh frequency of D1 being 1 Hz and the refresh frequency of D2 being 60 Hz as an example, the timing of STV1, STV2, mux1 and mux2 and the picture refresh situation can be as shown in FIG. 6*b*, and a first-category image frame is an image frame in which both the first-category pixel row and the second-category pixel row are refreshed, namely, a first frame, a sixty-first frame, etc.; the second-category image frame is an image frame in which the first-category pixel row is not refreshed, and the second-category pixel row is refreshed, namely, a second frame, a third frame, a fourth frame, etc.; the duration of the period corresponding to the second frame is the same as the duration of the second stage in the first frame. In the first frame, in the first stage, the mux1 inputs a low level, the first-category switch is turned on, the mux2 inputs a high level, the second-category switch is turned off, and D1 is refreshed, and D2 is not refreshed; after the refreshing of D1 is completed, the second stage is entered, the mux1 inputs a high level, the first-category switch is turned off, and the mux2 inputs a low level, the second-category switch is turned on, and D1 is not refreshed, and D2 is refreshed; in the second frame to the sixtieth frame, the mux1 inputs a high level, the first-category switch remains off, the picture in D1 is unchanged, the mux2 inputs a low level, the second-category switch remains on, and the picture in D2 is refreshed; the sixty-first frame is similar to the first frame, and the sixty-second frame to the one hundred twentieth frame are similar to the second frame, and refreshing in the following frames is repeated in the similar fashion. In this case, 1H=1/(D1 pixel row quantity 1000×1 Hz+D2 pixel row quantity 1000×60 Hz)=16.39 μs.

In the embodiment of the present disclosure, it is achieved that pixels in the same display substrate are refreshed at different refresh frequencies, which can reduce the display power consumption, thereby increasing the standby time of a display product; in addition, in the case of using the same category of data signal source, the input of Data signals in D1 and D2 are controlled via two categories of switches respectively, which can reduce the mutual influence of Data signals in D1 and D2 regions, thereby improving the display quality.

In a possible implementation, in case that a refresh frequency of the first-category pixel row is lower than a refresh frequency of the second-category pixel row, and a duration of a time period corresponding to the first-category image frame is the same as a duration of a time period corresponding to the second-category image frame, the time period corresponding to the first-category image frame includes a first stage and a second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for the time period corresponding to each first-category image frame, in the first stage of the time period, the first control line inputs a first voltage signal, the first-category switch is turned on, the first drive line inputs a starting signal, the second control line inputs a second voltage signal, the second-category switch is turned off, and the second drive line does not input a starting signal; in the second stage of the time period, the first control line inputs a second voltage signal, the first-category switch is turned off, the first drive line does not input a starting signal, the second control line inputs a first voltage signal, the second-category switch is turned on, and the second drive line inputs a starting signal; and in the time period corresponding to each second-category image frame, the first control line inputs a second voltage signal, the first-category switch is turned off, the first drive line does not input a starting signal, the second control line inputs a first voltage signal, the second-category switch is turned on, and the second drive line inputs a starting signal.

Figure 7:
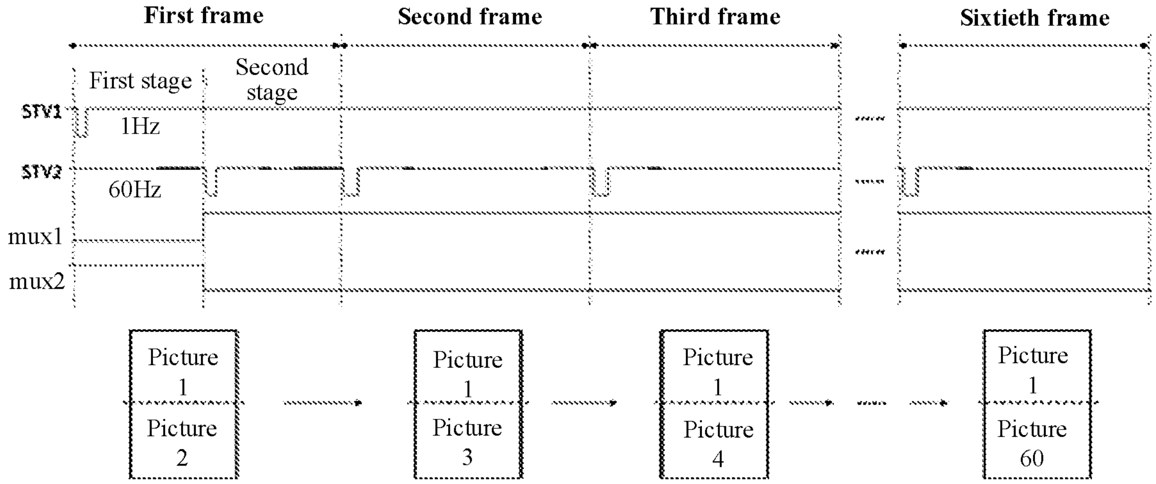
FIG. 7 is a fourth schematic diagram showing a refresh timing of a display substrate according to an embodiment of the present disclosure.

When D1 and D2 are refreshed at different frequencies, in one example, taking the refresh frequency of D1 being 1 Hz and the refresh frequency of D2 being 60 Hz as an example, the timing of STV1, STV2, mux1 and mux2 and the picture refresh situation can be as shown in FIG. 7, and a first-category image frame is an image frame in which both the first-category pixel row and the second-category pixel row are refreshed, namely, a first frame, a sixty-first frame, etc.; the second-category image frame is an image frame in which the first-category pixel row is not refreshed, and the second-category pixel row is refreshed, namely, a second frame, a third frame, a fourth frame, etc.; the duration of the time period corresponding to the second frame is the same as the duration of the time period corresponding to the first frame. In the first frame, in the first stage, the mux1 inputs a low level, the first-category switch is turned on, the mux2 inputs a high level, the second-category switch is turned off, and D1 is refreshed, and D2 is not refreshed; after the refresh of D1 is completed, the second stage is entered, the mux1 inputs a high level, the first-category switch is turned off, the mux2 inputs a low level, the second-category switch is turned on, and D1 is not refreshed, and D2 is refreshed; in the second frame to the sixtieth frame, in the first stage, the mux1 inputs a high level, the first-category switch remains off, and the picture in D1 remains unchanged; the mux2 inputs a high level, the second-category switch remains off, and the picture in D2 is not refreshed; in the second stage, the mux1 inputs a high level, the first-category switch remains off, and the picture in D1 remains unchanged; the mux2 inputs a low level, the second-category switch remains on, and the picture in D2 is refreshed; the sixty-first frame is similar to the first frame, and the sixty-second to one hundred twentieth frames are similar to the second frame, and refreshing in the following frames is repeated in the similar fashion. The time period corresponding to each frame is the same, and in the first frame: D1 and D2 are written and refreshed sequentially; in the second frame to the sixtieth frame, D1 is not refreshed, and only D2 is refreshed in the same time as the refresh time of D2 in the first frame. Therefore, the high-frequency writing time of D2 in the second to sixtieth frames is longer, which is advantageous for high frequency refreshing. The time period corresponding to each frame is the same, and in the first frame: D1 and D2 are written and refreshed sequentially; in the second frame to the sixtieth frame, D1 is not refreshed, and only D2 is refreshed in the same time as the refresh time of D2 in the first frame; therefore, the high-frequency writing time of D2 in the second frame to the sixtieth frame is longer, which is beneficial to the high-frequency refreshing.

In a possible implementation, in the case that the refresh frequency of the first-category pixel row is lower than the refresh frequency of the second-category pixel row, and the duration of the time period corresponding to the first-category image frame is the same as the duration of the time period corresponding to the second-category image frame, the time period corresponding to the first-category image frame includes a first stage and a second stage, and the time period corresponding to the second-category image frame includes a first stage and a second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for the time period corresponding to each first-category image frame, in the first stage of the time period, the first control line inputs a first voltage signal, the first-category switch is turned on, the first drive line inputs a starting signal, the second control line inputs a second voltage signal, the second-category switch is turned off, and the second drive line does not input a starting signal; in the second stage of the time period, the first control line inputs a second voltage signal, the first-category switch is turned off, the first drive line does not input a starting signal, the second control line inputs a first voltage signal, the second-category switch is turned on, and the second drive line inputs a starting signal; and for the time period corresponding to each second-category image frame, in the first stage of the time period, the first control line inputs a second voltage signal, the first-category switch is turned off, the first drive line does not input a starting signal, the second control line inputs a first voltage signal, the second-category switch is turned on, and the second drive line does not input a starting signal; in the second stage of the time period, the first control line inputs a second voltage signal, the first-category switch is turned off, the first drive line does not input a starting signal, the second control line inputs a first voltage signal, the second-category switch is turned on, and the second drive line inputs a starting signal.

Figure 8:
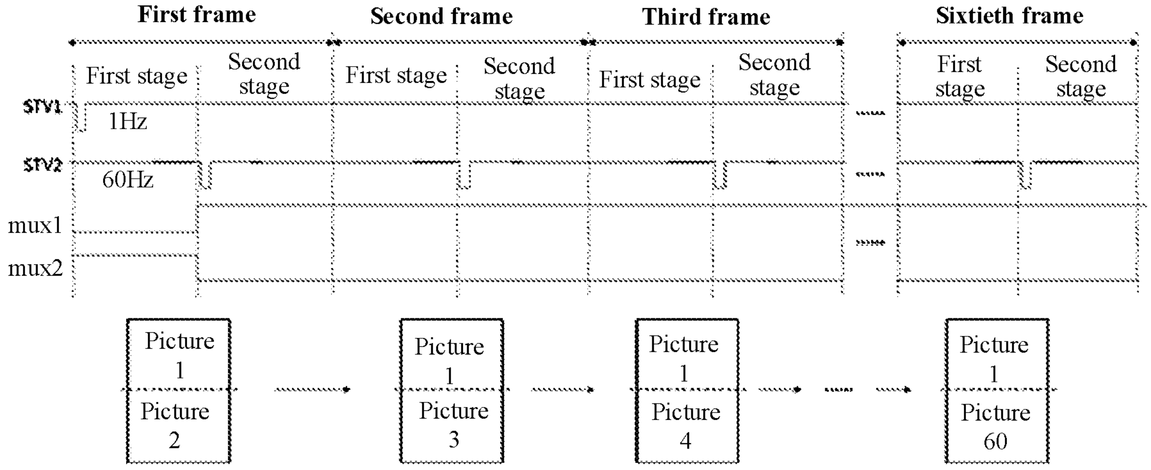
FIG. 8 is a fifth schematic diagram showing a refresh timing of a display substrate according to an embodiment of the present disclosure.

When D1 and D2 are refreshed at different frequencies, in one example, taking the refresh frequency of D1 being 1 Hz and the refresh frequency of D2 being 60 Hz as an example, the timing of STV1, STV2, mux1 and mux2 and the picture refresh situation can be as shown in FIG. 8, and a first-category image frame is an image frame in which both the first-category pixel row and the second-category pixel row are refreshed, namely, a first frame, a sixty-first frame, etc.; the second-category image frame is an image frame in which the first-category pixel row is not refreshed, and the second-category pixel row is refreshed, namely, a second frame, a third frame, a fourth frame, etc.; the duration of the time period corresponding to the second frame is the same as the duration of the time period corresponding to the first frame. In the first frame, in the first stage, the mux1 inputs a low level, the first-category switch is turned on, the mux2 inputs a high level, the second-category switch is turned off, and D1 is refreshed, and D2 is not refreshed; after the refresh of D1 is completed, the second stage is entered, the mux1 inputs a high level, the first-category switch is turned off, the mux2 inputs a low level, the second-category switch is turned on, and D1 is not refreshed, and D2 is refreshed; in the second frame to the sixtieth frame, the mux1 inputs a high level, the first-category switch remains off, the picture in D1 is unchanged, the mux2 inputs a low level, the second-category switch remains on, and D2 is refreshed at 60 Hz; the sixty-first frame is similar to the first frame, and the sixty-second to one hundred twentieth frames are similar to the second frame, and refreshing in the following frames is repeated in the similar fashion. The time period corresponding to each frame is the same, and in the first frame: D1 and D2 are written and refreshed sequentially; in the second frame to the sixtieth frame, the display region of D1 is not refreshed, refreshing is only performed in D2 in the second stage, and the writing time is kept unchanged.

In the embodiment of the present disclosure, it is achieved that pixels in the same display substrate are refreshed at different refresh frequencies, which can reduce the display power consumption, thereby increasing the standby time of a display product; in addition, in the case of using the same category of data signal source, the input of Data signals in D1 and D2 are controlled via two categories of switches respectively, which can reduce the mutual influence of Data signals in D1 and D2 regions, thereby improving the display quality.

In a possible implementation, the at least one category of data signal source includes a first-category data signal source; the display substrate further includes a third control line, the third control line is connected to the gate electrode of a third-category switch, the third-category switch is connected between the Data signal line of the first-category pixel row and the Data signal line of the second-category pixel row, and the first-category data signal source is connected to the Data signal line of the second-category pixel row.

Figure 9:
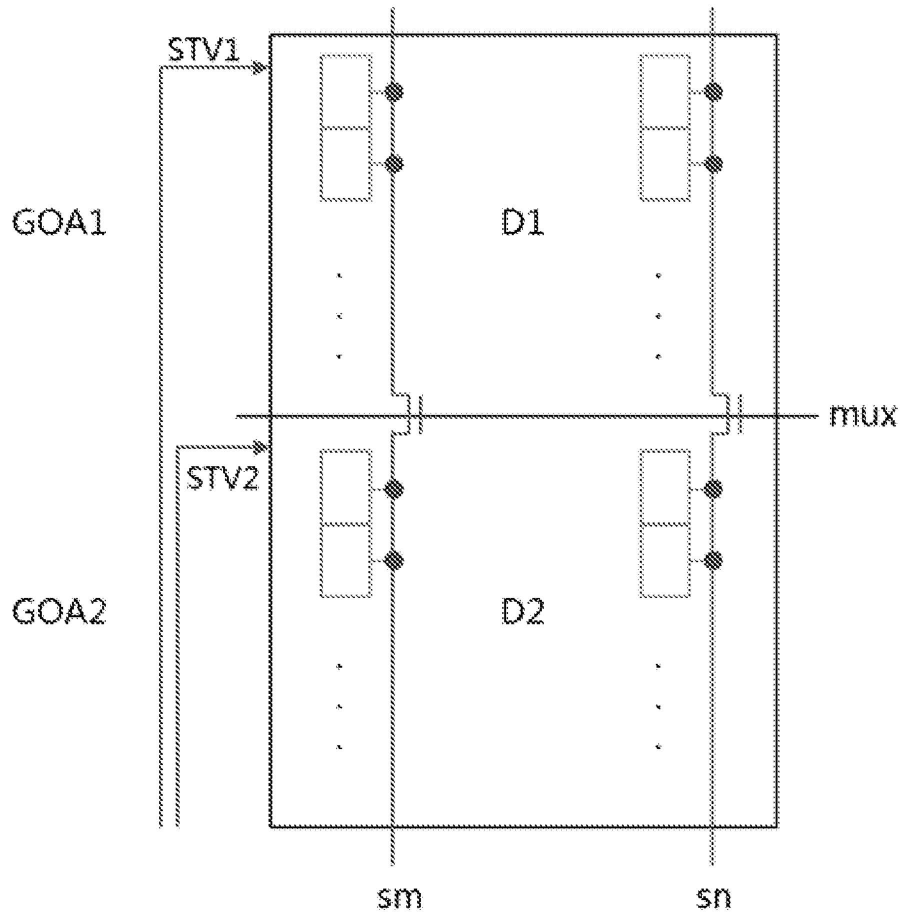
FIG. 9 is another schematic diagram of a display substrate according to an embodiment of the present disclosure.

Referring to FIG. 9, a display region of a display substrate includes a first display region D1 and a second display region D2, wherein the first-category pixel rows are located in the first display region D1, and the second-category pixel rows are located in the second display region D2. Sn is a data line of the $n^{th}$ first-category data signal source, sm is a data line of the $m^{th}$ first-category data signal source, one pixel column in the display substrate corresponds to one first-category data signal source, and similarly, one first-category data signal source corresponds to one pixel column in the display substrate, that is, a first-category data signal source i (the $i^{th}$ first-category data signal source) corresponds to one pixel column i (the $i^{th}$ pixel column) in the display substrate on a one-to-one basis. For the first-category data signal source i, the data line Si of the first-category data signal source i is connected to the Data signal line of the $i^{th}$ pixel in the second-category pixel row, and then is connected to the Data signal line of the $i^{th}$ pixel in the first-category pixel row via the third-category switch. The third control line mux is connected to a gate electrode of the third-category switch; the first drive line GOAL is connected to the first-category pixel rows in the first display region D1, and provides a starting signal STV1 of a first frequency to the first-category pixel rows; and the second drive line GOA2 is connected to the second-category pixel rows in the second display region D2, and provides a starting signal STV2 of a second frequency to the second-category pixel rows.

In the embodiments of the present disclosure, the GOA control unit is divided into two groups, wherein the GOAL provides a gate signal of the first display region D1, the GOA2 provides a gate signal of the second display region D2, a triode (the third-category switch) is added between the Data signal line of D1 and the Data signal line of D2, the triode controls whether D1 is to be refreshed, and the gate electrode of the triode is controlled via a third control line mux. When the triode is turned on, the Data signal line of D1 and the Data signal line of D2 is connected, and both D1 and D2 can receive the Data signal of the first-category data signal source; when the triode is turned off, the Data signal line of D1 is disconnected from the Data signal line of D2, D1 is not refreshed and keeps the display content of the preceding frame, and D2 is refreshed. The refreshing of D1 and D2 at different respective frequencies are realized through the third control line and the third-category switch. Compared with FIG. 4*a*, one control line and one category of switch can be omitted, thus the production cost can be reduced.

In a possible implementation, in case that the first-category pixel row and the second-category pixel row are refreshed at a same frequency, a duration of a time period corresponding to each image frame is the same;

in a time period corresponding to each image frame, wherein the time period includes a first stage and a second stage; in the first stage of the time period, the third control line inputs a first voltage signal, the third-category switch is turned on, the Data signal line of the first-category pixel row and the Data signal line of the second-category pixel row are connected, and the first drive line inputs a starting signal, and the second drive line does not input a starting signal; in the second stage of the time period, the third control line inputs a second voltage signal, the third-category switch is turned off, the Data signal line of the first-category pixel row is disconnected from the Data signal line of the second-category pixel row, the first drive line does not input a starting signal, and the second drive line inputs a starting signal.

Figure 10:
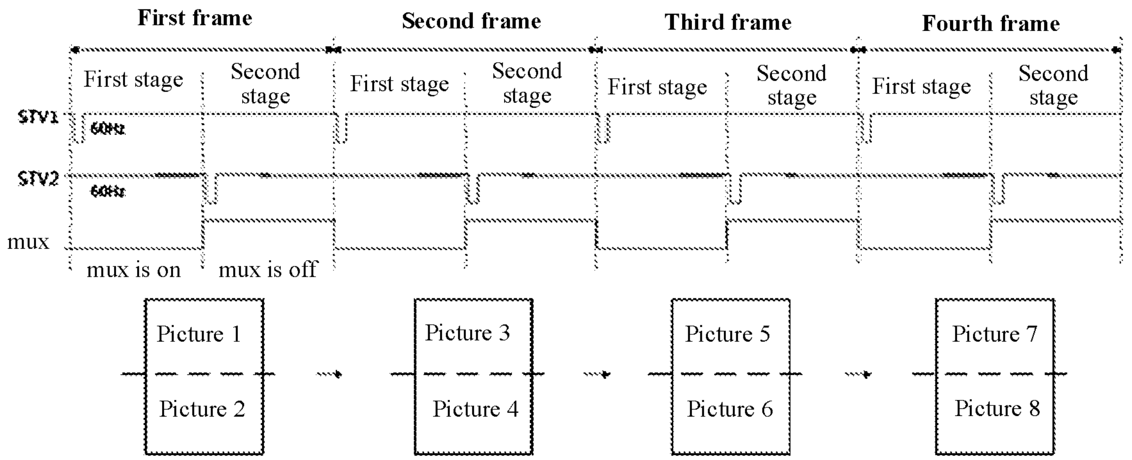
FIG. 10 is a sixth schematic diagram showing a refresh timing of a display substrate according to an embodiment of the present disclosure.

In one example, taking the case where the first voltage signal is a low level, the second voltage signal is a high level, and the refresh frequency is 60 Hz as an example, the timing of STV1, STV2 and mux and the picture refresh situation can be as shown in FIG. 10, and Mux is on during the refresh stage of STV2. For any one frame, in a first stage, the mux inputs a low level, the third-category switch is turned on, the STV1 inputs a starting signal, the STV2 does not input a starting signal, and D1 is refreshed and D2 is not refreshed; in the second stage, the mux input a high level, the third-category switch is turned off, D1 is not refreshed, the STV2 inputs a starting signal, D2 is refreshed; 1H=1/(D1 pixel row quantity 1000×60 Hz+D2 pixel row quantity 1000×60 Hz)=8.33 μs.

In a possible implementation, in case that a refresh frequency of the first-category pixel row is lower than a refresh frequency of the second-category pixel row, and a duration of a time period corresponding to a first-category image frame is different from a duration of a time period corresponding to a second-category image frame, the time period corresponding to the first-category image frame includes a first stage and a second stage, and a duration of the time period corresponding to the second-category image frame is the same as a duration of the second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for a time period corresponding to each first-category image frame, in a first stage of the time period, the third control line inputs a first voltage signal, the third-category switch is turned on, a Data signal line of the first-category pixel row is connected to a Data signal line of the second-category pixel row, and the first drive line inputs a starting signal, and the second drive line does not input a starting signal; in a second stage of the time period, the third control line inputs a second voltage signal, the third-category switch is turned off, the Data signal line of the first-category pixel row is disconnected from the Data signal line of the second-category pixel row, the first drive line does not input a starting signal, and the second drive line inputs a starting signal;

for a time period corresponding to each second-category image frame, during the time period, the third control line inputs a second voltage signal, the third-category switch is turned off, the Data signal line of the first-category pixel row is disconnected from the Data signal line of the second-category pixel row, and the first drive line does not input a starting signal, and the second drive line inputs a starting signal.

Figure 11A:
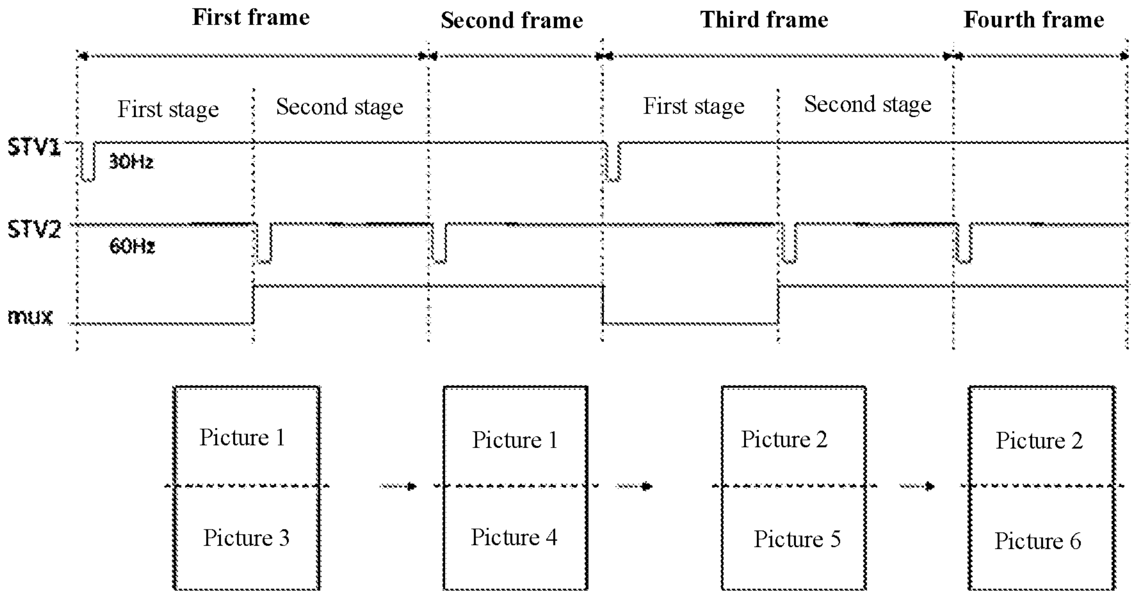
FIG. 11*a* is a seventh schematic diagram showing a refresh timing of a display substrate according to an embodiment of the present disclosure.

When D1 and D2 are refreshed at different frequencies, in one example, taking the refresh frequency of D1 being 30 Hz and the refresh frequency of D2 being 60 Hz as an example, the timing of STV1, STV2 and mux and the picture refresh situation can be as shown in FIG. 11*a*, and a first-category image frame is an image frame in which both the first-category pixel row and the second-category pixel row are refreshed, namely, a first frame, a third frame and a fifth frame, etc.; a second-category image frame is an image frame in which the first-category pixel row is not refreshed, and the second-category pixel row is refreshed, namely, a second frame, a fourth frame, a sixth frame, etc.; the duration of the corresponding period of the second frame is the same as the duration of the second stage in the first frame. In the first frame, in the first stage, the mux inputs a low level, the third-category switch is turned on, the STV1 inputs a starting signal, the STV2 does not input a starting signal, and D1 is refreshed and D2 is not refreshed; after the refreshing of D1 is completed, the second stage is entered, the mux inputs a high level, the third-category switch is turned off, D1 is not refreshed, the STV2 inputs a starting signal and D2 is refreshed. In the second frame, the mux inputs a high level, the third-category switch remains off, the picture in D1 is unchanged, the STV1 inputs a starting signal, and D2 continues to be refreshed at 60 Hz; in the third frame, in the first stage, the mux inputs a low level, the third-category switch is turned on, the STV1 inputs a starting signal, the STV2 does not input a starting signal, and D1 is refreshed and D2 is not refreshed; after the refreshing in D1 is completed, the second stage is entered, the mux inputs a high level, the third-category switch is turned off, D1 is not refreshed, the STV2 inputs a starting signal and D2 is refreshed; the fourth frame is similar to the second frame; and refreshing in the following frames is repeated in the similar fashion. In this case, 1H=1/(D1 pixel row quantity 1000×30 Hz+D2 pixel row quantity 1000×60 Hz)=11.11 μs.

Figure 11B:
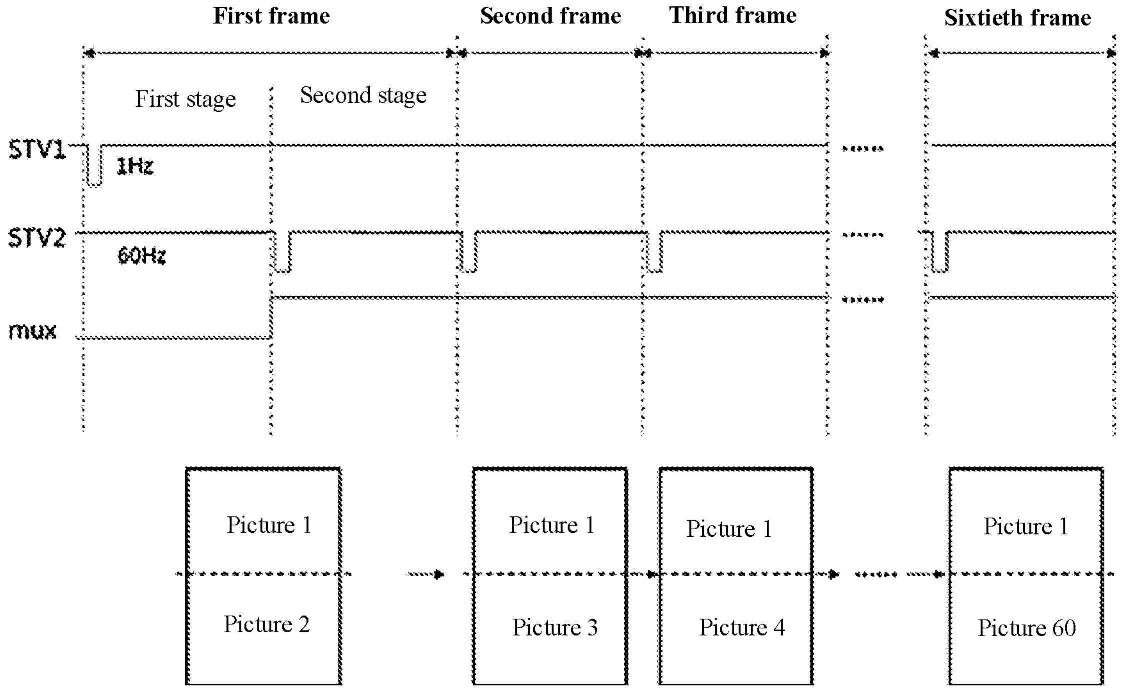
FIG. 11*b* is an eighth schematic diagram showing a refresh timing of a display substrate according to an embodiment of the present disclosure.

When D1 and D2 are refreshed at different frequencies, in one example, taking the refresh frequency of D1 being 1 Hz and the refresh frequency of D2 being 60 Hz as an example, the timing of STV1, STV2 and mux and the picture refresh situation can be as shown in FIG. 11*b*, and a first-category image frame is an image frame in which both a first-category pixel row and a second-category pixel row are refreshed, namely, a first frame, a sixty-first frame, etc.; the second-category image frame is an image frame in which the first-category pixel row is not refreshed, and the second-category pixel row is refreshed, namely, a second frame, a third frame, a fourth frame, etc.; the duration of the corresponding period of the second frame is the same as the duration of the second stage in the first frame. In the first frame: the mux inputs a low level, the third-category switch is turned on, the STV1 inputs a starting signal, the STV2 does not input a starting signal, and D1 is refreshed and D2 is not refreshed; after the refreshing in D1 is completed, the second stage is entered, the mux inputs a high level, the third-category switch is turned off, D1 is not refreshed, the STV2 inputs a starting signal and D2 is refreshed; in the second frame to the sixtieth frame, the mux inputs a high level, the third-category switch remains off, the picture in D1 is unchanged, the STV1 inputs a starting signal, and D2 continues to be refreshed at 60 Hz; the sixty-first frame is similar to the first frame, and the sixty-second to one hundred twentieth frames are similar to the second frame, and refreshing in the following frames is repeated in the similar fashion. In this case, 1H=1/(D1 pixel row quantity 1000×1 Hz+D2 pixel row quantity 1000×60 Hz)=16.39 μs.

In a possible implementation, in case that a refresh frequency of the first-category pixel row is lower than a refresh frequency of the second-category pixel row, and a duration of a time period corresponding to the first-category image frame is the same as a duration of a time period corresponding to the second-category image frame, the time period corresponding to the first-category image frame includes a first stage and a second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for a time period corresponding to each first-category image frame, in a first stage of the time period, the third control line inputs a first voltage signal, the third-category switch is turned on, an Data signal line of the first-category pixel row is connected to an Data signal line of the second-category pixel row, and the first drive line inputs a starting signal, and the second drive line does not input a starting signal; in a second stage of the time period, the third control line inputs a second voltage signal, the third-category switch is turned off, the Data signal line of the first-category pixel row is disconnected from the Data signal line of the second-category pixel row, the first drive line does not input a starting signal, and the second drive line inputs a starting signal;

for a time period corresponding to each second-category image frame, during the time period, the third control line inputs a second voltage signal, the third-category switch is turned off, the Data signal line of the first-category pixel row is disconnected from the Data signal line of the second-category pixel row, and the first drive line does not input a starting signal, and the second drive line inputs a starting signal.

Figure 12:
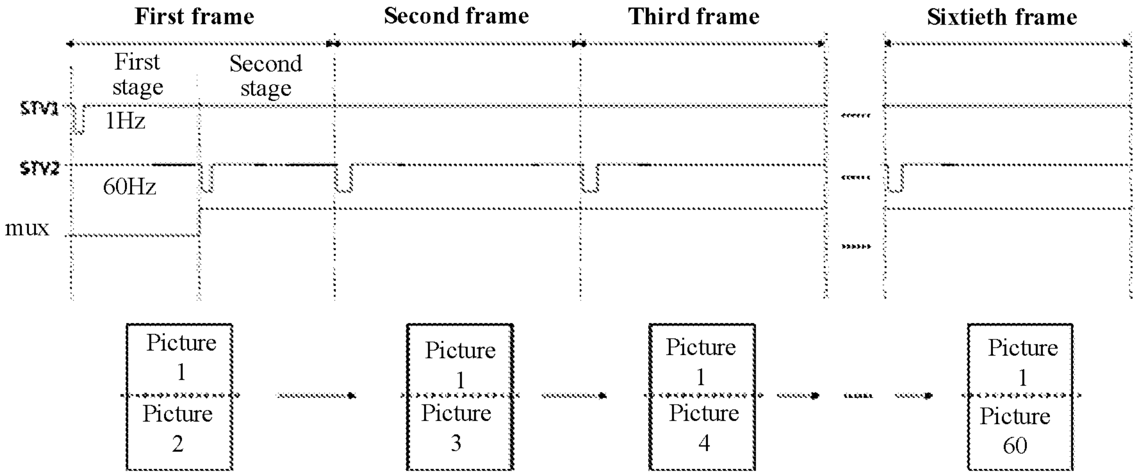
FIG. 12 is a ninth schematic diagram showing a refresh timing of a display substrate according to an embodiment of the present disclosure.

When D1 and D2 are refreshed at different frequencies, in one example, taking the refresh frequency of D1 being 1 Hz and the refresh frequency of D2 being 60 Hz as an example, the timing of STV1, STV2 and mux and the picture refresh situation can be as shown in FIG. 12, and a first-category image frame is an image frame in which both the first-category pixel row and the second-category pixel row are refreshed, i.e. a first frame, a sixty-first frame, etc.; the second-category image frame is an image frame in which the first-category pixel row is not refreshed, and the second-category pixel row is refreshed, namely, a second frame, a third frame, a fourth frame, etc.; the duration of the time period corresponding to the second frame is the same as the duration of the time period corresponding to the first frame. In the first frame, the mux inputs a low level, the third-category switch is turned on, the STV1 inputs a starting signal, the STV2 does not input a starting signal, and D1 is refreshed and D2 is not refreshed; after the refreshing in D1 is completed, the second stage is entered, the mux inputs a high level, the third-category switch is turned off, D1 is not refreshed, the STV2 inputs a starting signal, and D2 is refreshed; in the second frame to the sixtieth frame, the mux inputs a high level, the third-category switch remains off, the picture in D1 is unchanged, the STV1 inputs a starting signal, and D2 continues to be refreshed at 60 Hz; the sixty-first frame is similar to the first frame, and the sixty-second to one hundred twentieth frames are similar to the second frame, and refreshing in the following frames is repeated in the similar fashion. The time period corresponding to each frame is the same, and in the first frame, D1 and D2 are written and refreshed sequentially; in the second frame to the sixtieth frame, D1 is not refreshed, and only D2 is refreshed in the same time as the refresh time of D2 in the first frame. Therefore, the high-frequency writing time of D2 in the second to sixtieth frames is longer, which is advantageous for high frequency refreshing. The time period corresponding to each frame is the same, and in the first frame: D1 and D2 are written and refreshed sequentially; in the second frame to the sixtieth frame, D1 is not refreshed, and only D2 is refreshed in the same time as the refresh time of D2 in the first frame; therefore, the high-frequency writing time of D2 in the second frame to the sixtieth frame is longer, which is beneficial to the high-frequency refreshing.

In the following, the case in which the at least one category of data signal source includes two categories of data signal sources is described.

In a possible implementation, the at least one category of data signal source includes a second-category data signal source and a third-category data signal source; the second-category data signal source is connected to the Data signal line of the first-category pixel row, and the third-category data signal source is connected to the Data signal line of the second-category pixel row.

Figure 13A:
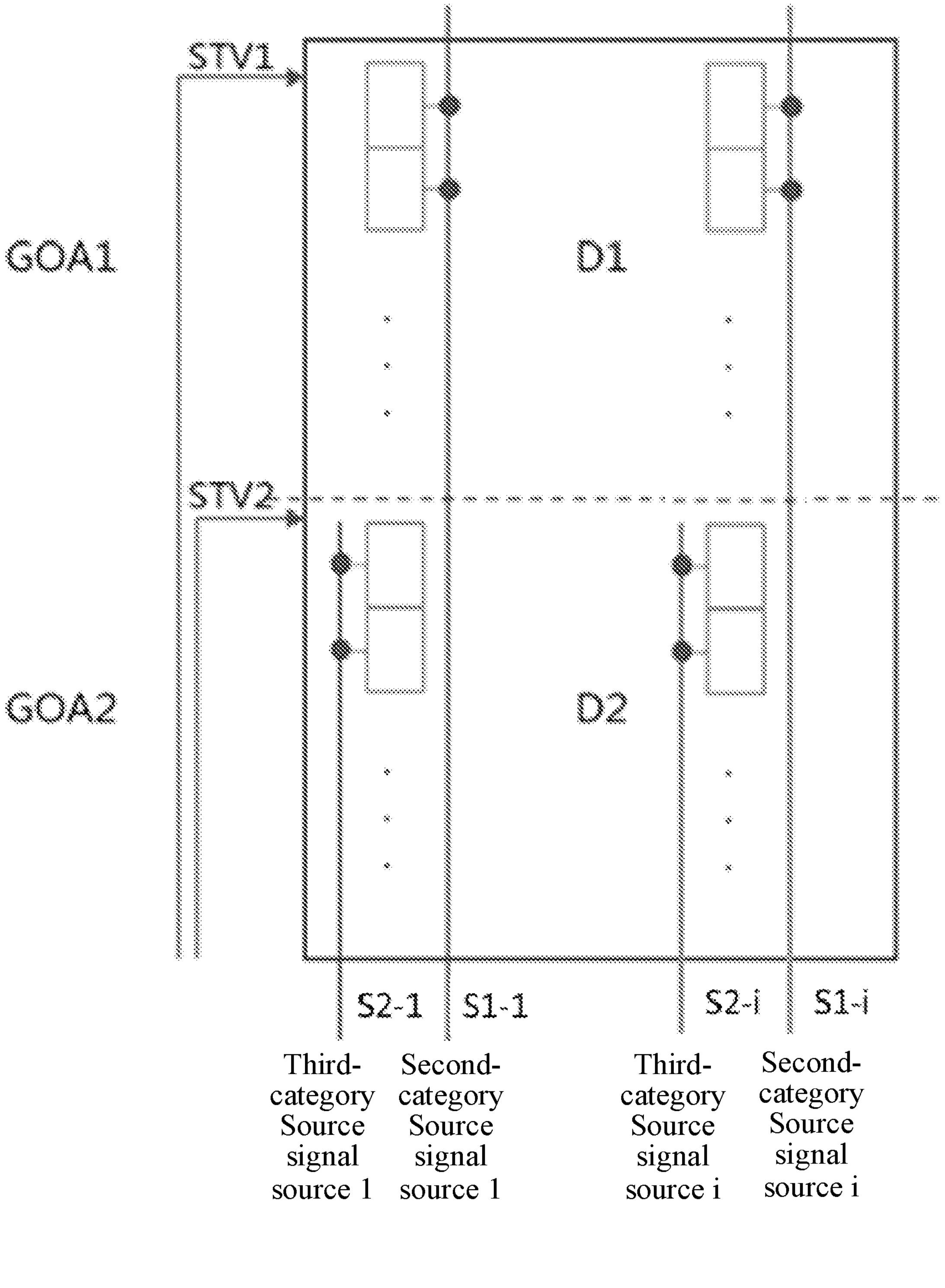
FIG. 13*a* is still another schematic diagram of a display substrate according to an embodiment of the present disclosure.

The display region of the display substrate includes a first display region D1 and a second display region D2, wherein a first-category pixel row is located in the first display region D1, and a second-category pixel row is located in the second display region D2. One pixel column in D1 corresponds to one second-category data signal source, and similarly, one second-category data signal source corresponds to one pixel column in D1, that is, the second-category data signal source i corresponds to the $i^{th}$ pixel column in D1 on a one-to-one basis; one pixel column in D2 corresponds to one third-category data signal source, and similarly, one third-category data signal source corresponds to one pixel column in D2, that is, the third-category data signal source i corresponds to the $i^{th}$ pixel column in D2 on a one-to-one basis. S2-*i* is the Data line of the $i^{th}$ pixel column in D2, S1-*i* is the Data line of the $i^{th}$ pixel column in D1, the data line of the $i^{th}$ second-category data signal source (the second-category data signal source i) is connected to S1-*i*, and the data line of the $i^{th}$ third-category data signal source (the third-category data signal source i) is connected to S2-*i*. For example, the data line of the third-category data signal source 1 is connected to the Data signal line S2-1 of the first pixel column in D2, and the data line of the second-category data signal source 1 is connected to the Data signal line S1-1 of the first pixel column in D1. The first drive line GOAL is connected to a first-category pixel row in the first display region D1, and provides a starting signal STV1 of a first frequency to the first-category pixel row; and the second drive line GOA2 is connected to a second-category pixel row in the first display region D2, and provides a starting signal STV2 of a second frequency to the second-category pixel row. In one example, as shown in FIG. 13*a*, the second-category data signal source and the third-category data signal source can be located on the same side of the display region (including D1 and D2), and at this time, the length of the Data signal line S1-1 of the pixel column in D1 that corresponds to the data line of the second-category data signal source 1 is greater than the length of the Data signal line S2-1 of the pixel column in D2 that corresponds to the data line of the third-category data signal source 1. In addition, the wiring length of STV1 is greater than the wiring length of STV2.

Figure 13B:
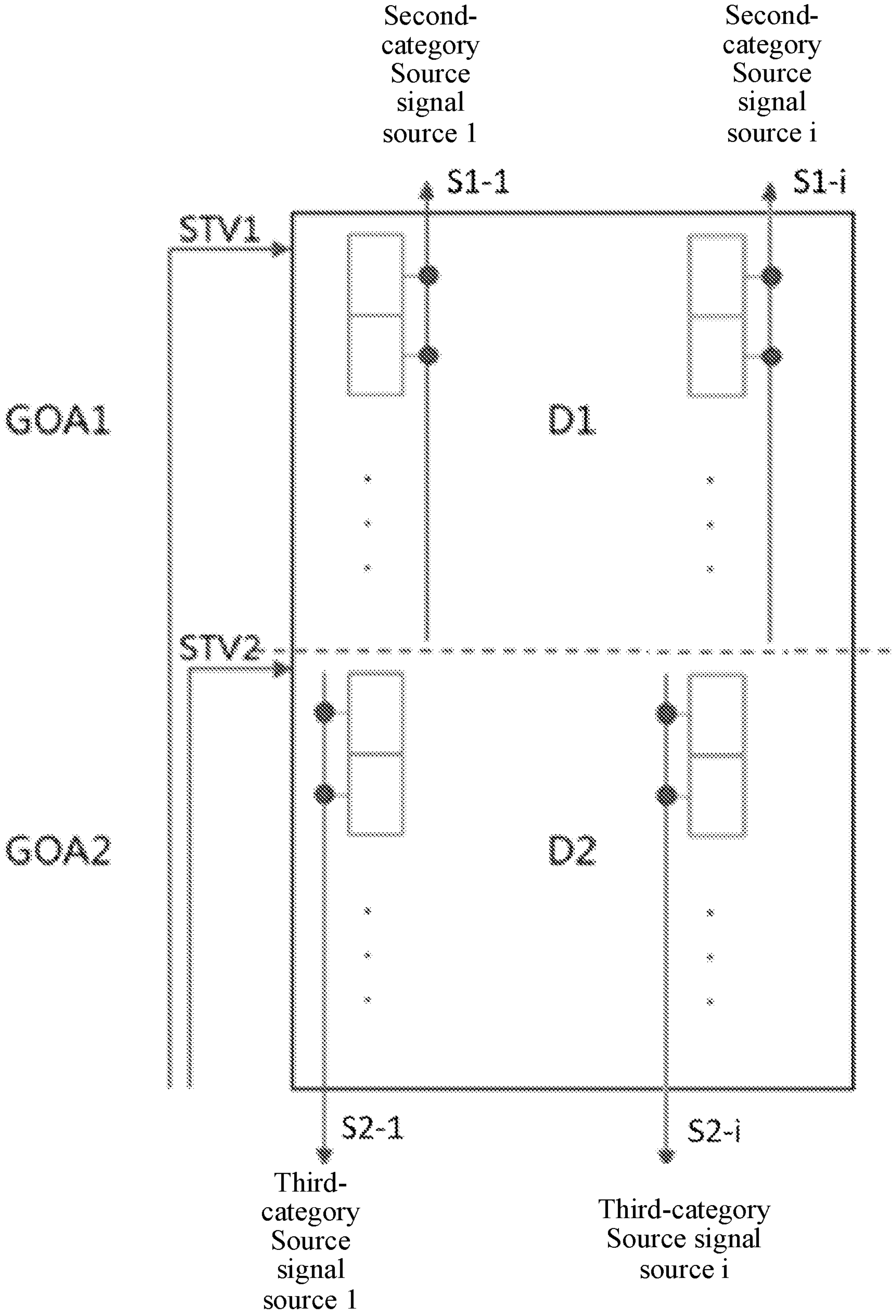
FIG. 13*b* is yet another schematic diagram of a display substrate according to an embodiment of the present disclosure.

Optionally, in one example, as shown in FIG. 13*b*, the second-category data signal source and the third-category data signal source may be located on two sides (different sides) of the display region, respectively. It can be understood that the positions of D1 and D2 can be swapped, which still falls within the scope of the present disclosure. Both the Data signal line S1-1 of the pixel column in D1 that corresponds to the data line of the second-category data signal source 1 and the Data signal line S2-1 of the pixel column in D2 that corresponds to the data line of the third-category data signal source 1 discontinue at the boundary between D1 and D2, thereby reducing unnecessary redundant wiring of the pixel columns.

Since D1 and D2 adopt independent data signal sources and drive lines, D1 and D2 can be logically regarded as two independent screens. Refreshing of D1 and D2 can be performed by using their respective data signal sources and drive lines. Of course, D1 and D2 can utilize the picture refreshing manner described for the case where there is only one data signal source.

In a possible implementation, in the case that the first-category pixel row and the second-category pixel row are refreshed at the same frequency, the duration of the time period corresponding to each image frame is the same; the time period corresponding to each image frame includes a first stage and a second stage; in the first stage of the time period, the second-category data signal source outputs a Data signal, the first drive line inputs a starting signal, the third-category data signal source does not output a Data signal, and the second drive line does not input a starting signal; in the second stage of the time period, the second-category data signal source does not output the Data signal, the first drive line does not input the starting signal, the third-category data signal source outputs the Data signal, and the second drive line inputs the starting signal.

In a possible implementation, in case that a refresh frequency of the first-category pixel row is lower than a refresh frequency of the second-category pixel row, and a duration of a time period corresponding to a first-category image frame is different from a duration of a time period corresponding to a second-category image frame, the time period corresponding to the first-category image frame includes a first stage and a second stage, and a duration of the time period corresponding to the second-category image frame is the same as a duration of the second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for a time period corresponding to each first-category image frame, in a first stage of the time period, the second-category data signal source outputs an Data signal, the first drive line inputs a starting signal, the third-category data signal source does not output the Data signal, and the second drive line does not input the starting signal; in a second stage of the time period, the second-category data signal source does not output an Data signal, the first drive line does not input a starting signal, the third-category data signal source outputs an Data signal, and the second drive line inputs a starting signal;

during the time period corresponding to each second-category image frame, the second-category data signal source does not output a Data signal, the first drive line does not input a starting signal, the third-category data signal source outputs a Data signal, and the second drive line inputs a starting signal.

In a possible implementation, in case that a refresh frequency of the first-category pixel row is lower than a refresh frequency of the second-category pixel row, and a duration of a time period corresponding to a first-category image frame is the same as a duration of a time period corresponding to a second-category image frame, the time period corresponding to the first-category image frame includes a first stage and a second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for a time period corresponding to each first-category image frame, in a first stage of the time period, the second-category data signal source outputs an Data signal, the first drive line inputs a starting signal, the third-category data signal source does not output the Data signal, and the second drive line does not input the starting signal; in a second stage of the time period, the second-category data signal source does not output an Data signal, the first drive line does not input a starting signal, the third-category data signal source outputs an Data signal, and the second drive line inputs a starting signal;

during the time period corresponding to each second-category image frame, the second-category data signal source does not output a Data signal, the first drive line does not input a starting signal, the third-category data signal source outputs a Data signal, and the second drive line inputs a starting signal.

In a possible implementation, in case that a refresh frequency of the first-category pixel row is lower than a refresh frequency of the second-category pixel row, and a duration of a time period corresponding to a first-category image frame is the same as a duration of a time period corresponding to a second-category image frame, the time period corresponding to the first-category image frame includes a first stage and a second stage, and the time period corresponding to the second-category image frame includes a first stage and a second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for a time period corresponding to each first-category image frame, in a first stage of the time period, the second-category data signal source outputs an Data signal, the first drive line inputs a starting signal, the third-category data signal source does not output the Data signal, and the second drive line does not input the starting signal; in a second stage of the time period, the second-category data signal source does not output an Data signal, the first drive line does not input a starting signal, the third-category data signal source outputs an Data signal, and the second drive line inputs a starting signal;

for a time period corresponding to each second-category image frame, in a first stage of the time period, the second-category data signal source does not output an Data signal, and the first circuit does not input a starting signal, the third-category data signal source outputs an Data signal, and the second drive line does not input a starting signal; in the second stage of the time period, the second-category data signal source does not output the Data signal, the first drive line does not input the starting signal, the third-category data signal source outputs the Data signal, and the second drive line inputs the starting signal.

Further, an embodiment of the present disclosure provides a display screen including the display substrate according to any embodiment of the present disclosure.

Further, an embodiment of the present disclosure provides a driving method of a display substrate, which is applied to the display substrate according to any embodiment of the present disclosure, wherein the method includes:

using the first drive line to provide a starting signal of a first frequency to the first-category pixel row, and using the at least one category of data signal source to provide a data signal to the data signal line of the first-category pixel row, to refresh the first-category pixel row at the first frequency; and using the second drive line to provide a starting signal of a second frequency to the second-category pixel row, and using the at least one category of data signal source to provide a data signal to the data signal line of the second-category pixel row, to refresh the second-category pixel row at the second frequency.

In a possible implementation, the using the first drive line to provide a starting signal of a first frequency to the first-category pixel row, and using the at least one category of data signal source to provide a data signal to the data signal line of the first-category pixel row, to refresh the first-category pixel row at the first frequency; and, using the second drive line to provide a starting signal of a second frequency to the second-category pixel row, and using the at least one category of data signal source to provide a data signal to the data signal line of the second-category pixel row, to refresh the second-category pixel row at the second frequency includes:

using the first drive line to provide the starting signal of the first frequency to the first-category pixel row, using the first control line to control the first-category switch to be turned on, and using the second control line to control the second-category switch to be turned off; in case that the first-category switch is turned on, using the first-category data signal source to provide the data signal to the data signal line of the first-category pixel row, to refresh the first-category pixel row at the first frequency; and using the second drive line to provide the starting signal of the second frequency to the second-category pixel row, using the second control line to control the second-category switch to be turned on, and using the first control line to control the first-category switch to be turned off; in case that the second-category switch is turned on, using the first-category data signal source to provide the data signal to the data signal line of the second-category pixel row, to refresh the second-category pixel row at the second frequency.

In a possible implementation, the using the first drive line to provide a starting signal of a first frequency to the first-category pixel row, and using the at least one category of data signal source to provide a data signal to the data signal line of the first-category pixel row, to refresh the first-category pixel row at the first frequency; and, using the second drive line to provide a starting signal of a second frequency to the second-category pixel row, and using the at least one category of data signal source to provide a data signal to the data signal line of the second-category pixel row, to refresh the second-category pixel row at the second frequency includes:

using the first drive line to provide the starting signal of the first frequency to the first-category pixel row, and using the third control line to control the third-category switch to be turned on; in case that the third-category switch is turned on, using the first-category data signal source to provide the data signal to the data signal line of the first-category pixel row, to refresh the first-category pixel row at the first frequency; and using the second drive line to provide the starting signal of the second frequency to the second-category pixel row, using the third control line to control the third-category switch to be turned off, and using the first-category data signal source to provide the data signal to the data signal line of the second-category pixel row, to refresh the second-category pixel row at the second frequency.

It is noted that, relational terms used here in, such as "first" and "second", are merely used to distinguish one entity or operation from another entity or operation, without requiring or implying any such an actual relation or sequence existing among these entities or operations. Moreover, “include”, “have” and any variations thereof in the present disclosure are intended to cover a non-exclusive inclusion, such that a process, a method, an article, or a device that includes a series of elements not only includes the series of elements, but also may include other elements not expressly listed or include elements inherent in the process, the method, the article, or the device. Without further limitation, an element preceded by “includes or including” does not preclude existence of additional identical elements in the process, the method, the article, or the device including the element.

The embodiments provided in the specification are described in a progressive manner and the description of each embodiment focuses on its difference from other embodiments, thus the same or similar part among various embodiments may be referred with each other.

The above descriptions merely describe preferred embodiments of the present disclosure, but the scope of the present disclosure is not limited thereto. Any modifications, equivalent replacements or improvements made without departing from the spirit and principle of the disclosure shall fall within the scope of the present disclosure.

What is claimed is:

1. A display substrate, comprising:

a first-category pixel row, a second-category pixel row, a first drive line, a second drive line, and at least one category of data signal source;

the first drive line is used for providing a starting signal of a first frequency to the first-category pixel row; the second drive line is used for providing a starting signal of a second frequency to the second-category pixel row; and the at least one category of data signal source is used for providing a data signal to data signal lines of the first-category pixel row and the second-category pixel row;

the at least one category of data signal source comprises a first-category data signal source; the first-category data signal source is connected to the data signal line of the first-category pixel row via a first-category switch, and is also connected to the data signal line of the second-category pixel row via a second-category switch; and the display substrate further comprises a first control line and a second control line; the first control line is connected to a gate electrode of the first-category switch; the second control line is connected to a gate electrode of the second-category switch; wherein the first-category switch is used for controlling on-off of the data signal line of the first-category pixel row, and the second-category switch is used for controlling on-off of the data signal line of the second-category pixel row;

wherein, in case that the first-category pixel row and the second-category pixel row are refreshed at a same frequency, a duration of a time period corresponding to each image frame is the same; the time period corresponding to each image frame comprises a first stage and a second stage; in the first stage of the time period, the first control line inputs a first voltage signal, the first-category switch is turned on, and the first drive line inputs a starting signal; the second control line inputs a second voltage signal, the second-category switch is turned off, and the second drive line does not input a starting signal; in the second stage of the time period, the first control line inputs the second voltage signal, the first-category switch is turned off, and the first drive line does not input the starting signal; the second control line inputs the first voltage signal, the second-category switch is turned on, and the second drive line inputs the starting signal;

or;

in case that a refresh frequency of the first-category pixel row is lower than a refresh frequency of the second-category pixel row, and a duration of a time period corresponding to a first-category image frame is different from a duration of a time period corresponding to a second-category image frame, the time period corresponding to the first-category image frame comprises a first stage and a second stage, and a duration of the time period corresponding to the second-category image frame is the same as a duration of the second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for the time period corresponding to each first-category image frame, in the first stage of the time period, the first control line inputs a first voltage signal, the first-category switch is turned on, and the first drive line inputs a starting signal; the second control line inputs a second voltage signal, the second-category switch is turned off, and the second drive line does not input a starting signal; in the second stage of the time period, the first control line inputs the second voltage signal, the first-category switch is turned off, and the first drive line does not input the starting signal; the second control line inputs the first voltage signal, the second-category switch is turned on, and the second drive line inputs the starting signal; and in the time period corresponding to each second-category image frame, the first control line inputs the second voltage signal, the first-category switch is turned off, and the first drive line does not input the starting signal; the second control line inputs the first voltage signal, the second-category switch is turned on, and the second drive line inputs the starting signal;

or;

in case that a refresh frequency of the first-category pixel row is lower than a refresh frequency of the second-category pixel row, and a duration of a time period corresponding to a first-category image frame is the same as a duration of a time period corresponding to a second-category image frame, the time period corresponding to the first-category image frame comprises a first stage and a second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for the time period corresponding to each first-category image frame, in the first stage of the time period, the first control line inputs a first voltage signal, the first-category switch is turned on, and the first drive line inputs a starting signal; the second control line inputs a second voltage signal, the second-category switch is turned off, and the second drive line does not input a starting signal; in the second stage of the time period, the first control line inputs the second voltage signal, the first-category switch is turned off, and the first drive line does not input the starting signal; the second control line inputs the first voltage signal, the second-category switch is turned on, and the second drive line inputs the starting signal; and in the time period corresponding to each second-category image frame, the first control line inputs the second voltage signal, the first-category switch is turned off, and the first drive line does not input the starting signal; the second control line inputs the first voltage signal, the second-category switch is turned on, and the second drive line inputs the starting signal;

or;

in case that a refresh frequency of the first-category pixel row is lower than a refresh frequency of the second-category pixel row, and a duration of a time period corresponding to a first-category image frame is the same as a duration of a time period corresponding to a second-category image frame, the time period corresponding to the first-category image frame comprises a first stage and a second stage, and the time period corresponding to the second-category image frame comprises a first stage and a second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for the time period corresponding to each first-category image frame, in the first stage of the time period, the first control line inputs a first voltage signal, the first-category switch is turned on, and the first drive line inputs a starting signal; the second control line inputs a second voltage signal, the second-category switch is turned off, and the second drive line does not input a starting signal; in the second stage of the time period, the first control line inputs the second voltage signal, the first-category switch is turned off, and the first drive line does not input the starting signal; the second control line inputs the first voltage signal, the second-category switch is turned on, and the second drive line inputs the starting signal; and for the time period corresponding to each second-category image frame, in the first stage of the time period, the first control line inputs the second voltage signal, the first-category switch is turned off, and the first drive line does not input the starting signal; the second control line inputs the first voltage signal, the second-category switch is turned on, and the second drive line inputs the starting signal; in the second stage of the time period, the first control line inputs the second voltage signal, the first-category switch is turned off, and the first drive line does not input the starting signal; the second control line inputs the first voltage signal, the second-category switch is turned on, and the second drive line inputs the starting signal.

2. The display substrate according to claim 1, wherein the first-category pixel row forms a first display region of the display substrate, and the second-category pixel row forms a second display region of the display substrate, a display region of the display substrate comprising the first display region and the second display region.

3. The display substrate according to claim 1, wherein a display region formed by the first-category pixel row and a display region formed by the second-category pixel row are alternately arranged on the display substrate.

4. A display screen, comprising a display substrate, wherein the display substrate comprises:

a first-category pixel row, a second-category pixel row, a first drive line, a second drive line, and at least one category of data signal source;

the first drive line is used for providing a starting signal of a first frequency to the first-category pixel row; the second drive line is used for providing a starting signal of a second frequency to the second-category pixel row; and the at least one category of data signal source is used for providing a data signal to data signal lines of the first-category pixel row and the second-category pixel row;

the at least one category of data signal source comprises a first-category data signal source; the first-category data signal source is connected to the data signal line of the first-category pixel row via a first-category switch, and is also connected to the data signal line of the second-category pixel row via a second-category switch; and the display substrate further comprises a first control line and a second control line; the first control line is connected to a gate electrode of the first-category switch; the second control line is connected to a gate electrode of the second-category switch; wherein the first-category switch is used for controlling on-off of the data signal line of the first-category pixel row, and the second-category switch is used for controlling on-off of the data signal line of the second-category pixel row;

wherein, in case that the first-category pixel row and the second-category pixel row are refreshed at a same frequency, a duration of a time period corresponding to each image frame is the same; the time period corresponding to each image frame comprises a first stage and a second stage; in the first stage of the time period, the first control line inputs a first voltage signal, the first-category switch is turned on, and the first drive line inputs a starting signal; the second control line inputs a second voltage signal, the second-category switch is turned off, and the second drive line does not input a starting signal; in the second stage of the time period, the first control line inputs the second voltage signal, the first-category switch is turned off, and the first drive line does not input the starting signal; the second control line inputs the first voltage signal, the second-category switch is turned on, and the second drive line inputs the starting signal;

or;

in case that a refresh frequency of the first-category pixel row is lower than a refresh frequency of the second-category pixel row, and a duration of a time period corresponding to a first-category image frame is different from a duration of a time period corresponding to a second-category image frame, the time period corresponding to the first-category image frame comprises a first stage and a second stage, and a duration of the time period corresponding to the second-category image frame is the same as a duration of the second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for the time period corresponding to each first-category image frame, in the first stage of the time period, the first control line inputs a first voltage signal, the first-category switch is turned on, and the first drive line inputs a starting signal; the second control line inputs a second voltage signal, the second-category switch is turned off, and the second drive line does not input a starting signal; in the second stage of the time period, the first control line inputs the second voltage signal, the first-category switch is turned off, and the first drive line does not input the starting signal; the second control line inputs the first voltage signal, the second-category switch is turned on, and the second drive line inputs the starting signal; and in the time period corresponding to each second-category image frame, the first control line inputs the second voltage signal, the first-category switch is turned off, and the first drive line does not input the starting signal; the second control line inputs the first voltage signal, the second-category switch is turned on, and the second drive line inputs the starting signal;

or;

in case that a refresh frequency of the first-category pixel row is lower than a refresh frequency of the second-category pixel row, and a duration of a time period corresponding to a first-category image frame is the same as a duration of a time period corresponding to a second-category image frame, the time period corresponding to the first-category image frame comprises a first stage and a second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for the time period corresponding to each first-category image frame, in the first stage of the time period, the first control line inputs a first voltage signal, the first-category switch is turned on, and the first drive line inputs a starting signal; the second control line inputs a second voltage signal, the second-category switch is turned off, and the second drive line does not input a starting signal; in the second stage of the time period, the first control line inputs the second voltage signal, the first-category switch is turned off, and the first drive line does not input the starting signal; the second control line inputs the first voltage signal, the second-category switch is turned on, and the second drive line inputs the starting signal; and in the time period corresponding to each second-category image frame, the first control line inputs the second voltage signal, the first-category switch is turned off, and the first drive line does not input the starting signal; the second control line inputs the first voltage signal, the second-category switch is turned on, and the second drive line inputs the starting signal;

or;

in case that a refresh frequency of the first-category pixel row is lower than a refresh frequency of the second-category pixel row, and a duration of a time period corresponding to a first-category image frame is the same as a duration of a time period corresponding to a second-category image frame, the time period corresponding to the first-category image frame comprises a first stage and a second stage, and the time period corresponding to the second-category image frame comprises a first stage and a second stage; wherein the first-category image frame is an image frame in which both the first-category pixel row and the second-category pixel row are refreshed, and the second-category image frame is an image frame in which the first-category pixel row is not refreshed and the second-category pixel row is refreshed;

for the time period corresponding to each first-category image frame, in the first stage of the time period, the first control line inputs a first voltage signal, the first-category switch is turned on, and the first drive line inputs a starting signal; the second control line inputs a second voltage signal, the second-category switch is turned off, and the second drive line does not input a starting signal; in the second stage of the time period, the first control line inputs the second voltage signal, the first-category switch is turned off, and the first drive line does not input the starting signal; the second control line inputs the first voltage signal, the second-category switch is turned on, and the second drive line inputs the starting signal; and for the time period corresponding to each second-category image frame, in the first stage of the time period, the first control line inputs the second voltage signal, the first-category switch is turned off, and the first drive line does not input the starting signal; the second control line inputs the first voltage signal, the second-category switch is turned on, and the second drive line inputs the starting signal; in the second stage of the time period, the first control line inputs the second voltage signal, the first-category switch is turned off, and the first drive line does not input the starting signal; the second control line inputs the first voltage signal, the second-category switch is turned on, and the second drive line inputs the starting signal.

5. A method for driving a display substrate, wherein the display substrate comprises:

a first-category pixel row, a second-category pixel row, a first drive line, a second drive line, and at least one category of data signal source;

the first drive line is used for providing a starting signal of a first frequency to the first-category pixel row; the second drive line is used for providing a starting signal of a second frequency to the second-category pixel row; and the at least one category of data signal source is used for providing a data signal to data signal lines of the first-category pixel row and the second-category pixel row;

wherein the method comprises:

using the first drive line to provide a starting signal of a first frequency to the first-category pixel row, and using the at least one category of data signal source to provide a data signal to the data signal line of the first-category pixel row, to refresh the first-category pixel row at the first frequency; and using the second drive line to provide a starting signal of a second frequency to the second-category pixel row, and using the at least one category of data signal source to provide a data signal to the data signal line of the second-category pixel row, to refresh the second-category pixel row at the second frequency;

the at least one category of data signal source comprises a first-category data signal source; the first-category data signal source is connected to the data signal line of the first-category pixel row via a first-category switch, and is also connected to the data signal line of the second-category pixel row via a second-category switch; and the display substrate further comprises a first control line and a second control line; the first control line is connected to a gate electrode of the first-category switch; the second control line is connected to a gate electrode of the second-category switch; wherein the first-category switch is used for controlling on-off of the data signal line of the first-category pixel row, and the second-category switch is used for controlling on-off of the data signal line of the second-category pixel row;

wherein the using the first drive line to provide the starting signal of the first frequency to the first-category pixel row, and using the at least one category of data signal source to provide the data signal to the data signal line of the first-category pixel row, to refresh the first-category pixel row at the first frequency; and, using the second drive line to provide the starting signal of the second frequency to the second-category pixel row, and using the at least one category of data signal source to provide the data signal to the data signal line of the second-category pixel row, to refresh the second-category pixel row at the second frequency comprises:

using the first drive line to provide the starting signal of the first frequency to the first-category pixel row, using the first control line to control the first-category switch to be turned on, and using the second control line to control the second-category switch to be turned off; in case that the first-category switch is turned on, using the first-category data signal source to provide the data signal to the data signal line of the first-category pixel row, to refresh the first-category pixel row at the first frequency; and using the second drive line to provide the starting signal of the second frequency to the second-category pixel row, using the second control line to control the second-category switch to be turned on, and using the first control line to control the first-category switch to be turned off; in case that the second-category switch is turned on, using the first-category data signal source to provide the data signal to the data signal line of the second-category pixel row, to refresh the second-category pixel row at the second frequency.

* * * * *